United States Patent
Nakahara

(10) Patent No.: US 10,506,133 B2
(45) Date of Patent: Dec. 10, 2019

(54) PRINTER, NON-TRANSITORY RECORDING MEDIUM STORING SCANNER PROFILE CORRECTION PROGRAM, AND SCANNER PROFILE CORRECTION METHOD

(71) Applicant: KONICA MINOLTA, INC., Chiyoda-ku, Tokyo (JP)

(72) Inventor: Hiroki Nakahara, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/130,371

(22) Filed: Sep. 13, 2018

(65) Prior Publication Data

US 2019/0089868 A1    Mar. 21, 2019

(30) Foreign Application Priority Data

Sep. 20, 2017    (JP) ................................ 2017-179744

(51) Int. Cl.
     *H04N 1/60*            (2006.01)

(52) U.S. Cl.
     CPC .......... *H04N 1/6008* (2013.01); *H04N 1/603* (2013.01); *H04N 1/6033* (2013.01); *H04N 1/6058* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,749,846 B2* | 6/2014 | Ito | H04N 1/603 |
| | | | 358/1.9 |
| 8,848,256 B2* | 9/2014 | Sasaki | H04N 1/6097 |
| | | | 358/3.24 |
| 10,129,438 B2* | 11/2018 | Yamaguchi | H04N 1/00045 |

(Continued)

FOREIGN PATENT DOCUMENTS

| | | |
|---|---|---|
| JP | 2010-137474 A | 6/2010 |
| JP | 2017-069855 A | 4/2017 |

OTHER PUBLICATIONS

Office Action dated Sep. 26, 2019, by the State Intellectual Property Office of People's Republic of China in corresponding Chinese Patent Application No. 201811086899.8 and an English translation of the Office Action. (12 pages).

*Primary Examiner* — Dung D Tran
(74) *Attorney, Agent, or Firm* — Buchanan Ingersoll & Rooney PC

(57) ABSTRACT

Provided are a printer, a non-transitory recording medium and a scanner profile correction method. A hardware processor chooses at least one color for each of sheets where images of a job are separately to be printed, successively from colors of a chart for a scanner profile creation. The hardware processor defines an arrangement of at least one patch of the at least one color in a blank space of each of the sheets, and instructs a print engine to print the at least one patch together with an image of the job on each of the sheets. In response to obtaining measured color values of the at least one patch printed on each sheet from an in-line scanner and an in-line spectrocolorimeter, the hardware processor updates a part of data of a scanner profile, corresponding to the at least one color, by using the obtained measured color values.

24 Claims, 14 Drawing Sheets

(56) References Cited

U.S. PATENT DOCUMENTS

| | | | |
|---|---|---|---|
| 2012/0257224 A1* | 10/2012 | Sasaki | H04N 1/6097 |
| | | | 358/1.9 |
| 2013/0258364 A1* | 10/2013 | Ito | H04N 1/603 |
| | | | 358/1.9 |
| 2016/0156810 A1 | 6/2016 | Nakamura | |
| 2018/0013926 A1* | 1/2018 | Yamaguchi | H04N 1/00045 |
| 2018/0097973 A1* | 4/2018 | Yoshizawa | H04N 1/6033 |
| 2018/0338067 A1* | 11/2018 | Kuroiwa | H04N 1/6033 |
| 2019/0089868 A1* | 3/2019 | Nakahara | H04N 1/6008 |

* cited by examiner

PRINTER, NON-TRANSITORY RECORDING MEDIUM STORING SCANNER PROFILE CORRECTION PROGRAM, AND SCANNER PROFILE CORRECTION METHOD

Japanese Patent Application No. 2017-179744 filed on Sep. 20, 2017, including description, claims, drawings, and abstract, the entire disclosure of which is incorporated herein by reference in its entirety.

TECHNOLOGICAL FIELD

The present invention is directed to printers, non-transitory recording media each storing a computer-readable program for correcting a scanner profile and scanner profile correction methods. In particular, the present invention is directed to printers each equipped with an in-line scanner and an in-line spectrocolorimeter, non-transitory recording media each storing a scanner correction program for correcting a scanner profile during processing of a job, and scanner profile correction methods.

BACKGROUND

Scanners are capable of higher resolution measurement in comparison with spectrocolorimeters so that scanners can capture not only color charts but also various kinds of image, and are expected to be used for color management of various kinds of image other than color charts. Color management is performed on the basis of device-independent color values, but device-independent color values are not given by just using a scanner. Therefore, color management using a scanner is performed by using a scanner profile. A scanner profile is created by the following operations. A printer prints a chart (color chart) including an array of color patches and the chart is measured with a scanner and a spectrocolorimeter. Measured values of the patches taken with the scanner (for example, RGB values) are associated with corresponding measured values of the patches taken with the spectrocolorimeters (for example, L*a*b* values in the CIE 1976 color space, XYZ values in the CIE 1931 color space. L*u*v* values in the CIE 1976 color space or CIECAM02 values), which are referred to as colorimetric values, to create a scanner profile.

Scanner profiles are used under the assumption that scanners output measured values with consistency during their usable time. However, measurements with a scanner sometimes lack consistency because of a change of the performance of the scanner with age and/or a change of the environmental condition, and it is preferable that a scanner profile is timely corrected. As an example of a technique relating to a correction of a scanner profile, Japanese Unexamined Patent Publication (JP-A) No. 2017-069855 discloses the following technique. The technique uses a controller that causes a print engine to print a first color chart and a second color chart including color patches of specific colors being on the edge of a color gamut of a printer, and causes an in-line scanner and an in-line colorimeter to obtain RGB values and colorimetric values of color patches of each of the first color chart and the second color chart. The controller creates a scanner profile by associating the RGB values and the colorimetric values of each of the color patches of the first color chart with each other. The controller determines a first color gamut of the printer by using one or both of the RGB values and the colorimetric values of the color patches of the first color chart, and further determines a second color gamut of the printer by using one or both of the RGB values and the colorimetric values of the color patches of the specific colors in the second color chart. The controller then corrects a scanner profile on the basis of a comparison results of the first color gamut and the second color gamut of the printer.

As an example of a technique relating to timely performing a correction, JP-A No. 2010-137474 discloses the following image forming apparatus. The image forming apparatus includes a recording head for forming an image on a recording medium, and a color-correction processor that performs a color correction of an input image data. The image forming apparatus further includes an image-output controller that controls the recording head according to the image data given after the color correction in such a manner that the image corresponding to the image data is formed on the recording medium. The image forming apparatus further includes a patch-forming controller that controls the recording head so as to form patches for color measurement, on the recording medium, and a memory device for storing output conditions for forming the image and measurement results of the patches for color measurement formed under the output conditions. The image forming apparatus further includes a correction-data updater that changes correction data to be used for the color correction to be performed by the color-correction processor, when a difference between a first measurement result and a second measurement result of the patches for color measurement exceeds a predetermined acceptable range, where the first measurement result is a measurement result of the patches for color measurement, obtained by forming and measuring the patches for color measurement, before starting of a print job or during processing of the print job, and the second measurement result is a measurement result of the patches for color measurement, stored in the memory device.

As disclosed in JP-A No. 2017-069855, a correction of a scanner profile uses a process of printing a color chart by a printer, and if a need for correction of a scanner profile arises during job processing, the job processing is suspended through the process of printing a color chart, in order to correct the scanner profile during the job processing. In view of that, a conventional system is configured to monitor the number of printed sheets or the time elapsed from the prior correction, and print a color chart at the end of processing of a certain job after a judgement that the number of printed sheets or the time elapsed from the prior correction exceeds a predetermined threshold.

Further, JP-A No. 2010-137474 discloses the technique to perform a test printing (print a proof) before actual printing (perform pressrun). In the test printing, the apparatus in the JP-A No. 2010-137474 creates patches for color measurement in a blank space (a non-image area) of a recording medium, measures the patches for color measurement with an in-line detector (an RGB array sensor), and changes correction data to be used for color correction in response to a judgement that a difference between a result of the measurement obtained and a result of the measurement stored in the memory device exceeds a predetermined acceptable range.

However, when processing a job containing a large amount of pages in the system configured to monitor printed matters continuously, measured values taken by a scanner can be inconsistent during printing a large amount of pages, and under such a situation, it is difficult to correct a scanner profile appropriately with the above-described technique to print a color chart at the end of processing of a job. Further, with the technique to arrange patches in a blank space of a sheet for test printing as disclosed in JP-A No. 2010-137474, it is difficult to arrange all the patches necessary for a correction of a scanner profile, in the blank space. Further, in a technique using the apparatus configured to measure patches with an in-line scanner as a disclosed in JP-A No. 2010-137474, patches can be arranged in margins at the upper, bottom, right and left ends of a printing sheet. However, in a case that an apparatus configured to measure patches with an inline scanner and an in-line spectrocolorimeter is used for the technique, it is necessary to place patches in a restricted part in the blank space (margins), which can be measured with the in-line spectrocolorimeter. It makes more difficult to arrange all the patches necessary for a correction of a scanner profile, in the blank space of a recording medium.

SUMMARY

The present invention is directed to printers, non-transitory recording media each storing a scanner profile correction program and scanner profile correction methods, which allow a printer or an apparatus in a printing system to correct a scanner profile appropriately during processing of a job.

A printer reflecting one aspect of the present invention is a printer comprising: a print engine configured to print images of a job to be reproduced on respective sheets. The printer further comprises an in-line scanner configured to measure a sheet to obtain a scanner value which is a color value taken by a measurement with the in-line scanner, an in-line spectrocolorimeter configured to measure a sheet to obtain a colorimeter value which is a color value taken by a measurement with the in-line spectrocolorimeter, and a hardware processor that performs the following operations. The operations include controlling a patch arrangement for each of sheets where images of a job are separately to be printed by the print engine, where the controlling the patch arrangement includes choosing at least one color for each of the sheets successively from colors of a chart to be used for creating a scanner profile in which scanner values and corresponding colorimeter values are associated with each other, defining an arrangement of at least one patch of the at least one color in a blank space of each of the sheets, and instructing the print engine to print the at least one patch together with an image of the job on each of the sheets. The operations further include, in response to obtaining a scanner value or values taken by a measurement of the at least one patch printed on each of the sheets, from the in-line scanner and a colorimeter value or values taken by a measurement of the at least one patch printed on the each of the sheets, from the in-line spectrocolorimeter, updating a part of data of the scanner profile, corresponding to the at least one color of the at least one patch, by using the scanner value or values and the colorimeter value or values obtained from the in-line scanner and the in-line spectrocolorimeter.

A non-transitory recording medium reflecting one aspect of the present invention stores a computer-readable program for correcting a scanner profile in an apparatus. The apparatus includes a hardware processor that controls a print engine, an in-line scanner and an in-line spectrocolorimeter. The print engine is configured to print images of a job to be reproduced on respective sheets. The in-line scanner is configured to measure a sheet to obtain a scanner value which is a color value taken by a measurement with the in-line scanner. The in-line spectrocolorimeter is configured to measure a sheet to obtain a colorimeter value which is a color value taken by a measurement with the in-line spectrocolorimeter. The program comprises instructions which, when executed by the hardware processor, cause the hardware processor to perform the following operations. The operations comprise: controlling a patch arrangement for each of sheets where images of a job are separately to be printed by the print engine, where the controlling the patch arrangement includes choosing at least one color for each of the sheets successively from colors of a chart to be used for creating a scanner profile in which scanner values and corresponding colorimeter values are associated with each other, defining an arrangement of at least one patch of the at least one color in a blank space of each of the sheets, and instructing the print engine to print the at least one patch together with an image of the job on each of the sheets. The operations further comprise: in response to obtaining a scanner value or values taken by a measurement of the at least one patch printed on each of the sheets, from the in-line scanner and a colorimeter value or values taken by a measurement of the at least one patch printed on the each of the sheets, from the in-line spectrocolorimeter, updating a part of data of the scanner profile, corresponding to the at least one color of the at least one patch, by using the scanner value or values and the colorimeter value or values obtained from the in-line scanner and the in-line spectrocolorimeter.

A scanner profile correction method reflecting one aspect of the present invention is a method of correcting a scanner profile in a system including a print engine, an in-line scanner and an in-line spectrocolorimeter. The print engine is configured to print images of a job to be reproduced on respective sheets. The in-line scanner is configured to measure a sheet to obtain a scanner value which is a color value taken by a measurement with the in-line scanner. The in-line spectrocolorimeter is configured to measure a sheet to obtain a colorimeter value which is a color value taken by a measurement with the in-line spectrocolorimeter. The method comprises: controlling a patch arrangement for each of sheets where images of a job are separately to be printed by the print engine, where the controlling the patch arrangement includes choosing at least one color for each of the sheets successively from colors of a chart to be used for creating a scanner profile in which scanner values and corresponding colorimeter values are associated with each other, defining an arrangement of at least one patch of the at least one color in a blank space of each of the sheets, and instructing the print engine to print the at least one patch together with an image of the job on each of the sheets. The method further comprises: in response to obtaining a scanner value or values taken by a measurement of the at least one patch printed on each of the sheets, from the in-line scanner and a colorimeter value or values taken by a measurement of the at least one patch printed on the each of the sheets, from the in-line spectrocolorimeter, updating a part of data of the scanner profile, corresponding to the at least one color of the at least one patch, by using the scanner value or values and the colorimeter value or values obtained from the in-line scanner and the in-line spectrocolorimeter.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Hereinafter, one or more embodiments of the present invention will be described with reference to the drawings. However, the scope of the invention is not limited to the illustrated embodiments.

Figures 15, 16:
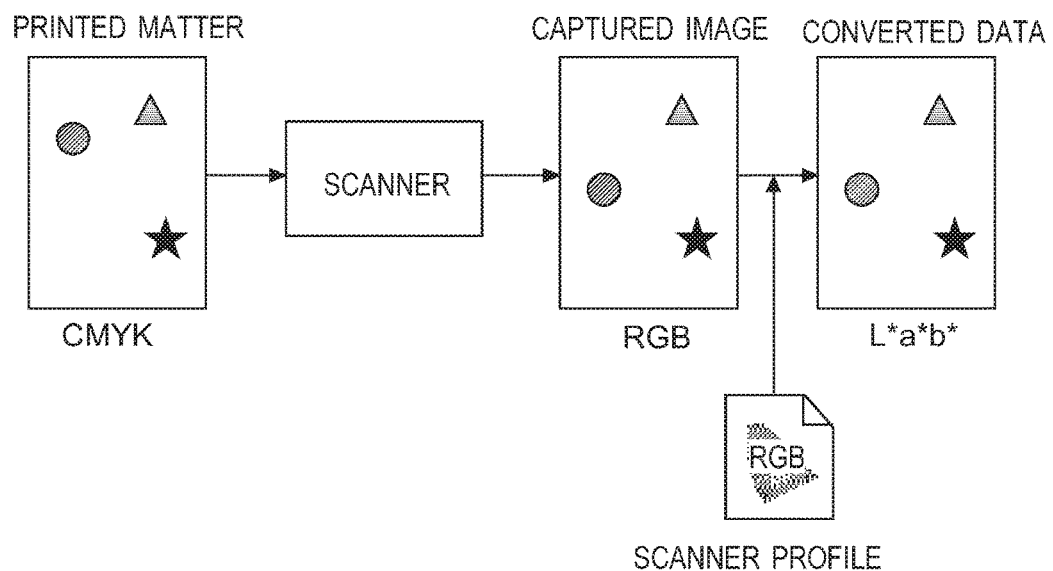
FIG. 15 is a schematic diagram illustrating an example of a color conversion method using a scanner profile.
FIG. 16 illustrates an example of a scanner profile.

As noted in the BACKGROUND, color management is performed on the basis of device-independent color values, but color management using scanner is performed by using a scanner profile because device-independent color values are not given by just using a scanner. For example, as illustrated in FIG. 15, by scanning a printed matter represented by CMYK, a scanner captures an image of the printed matter represented by RGB. Since color management is performed on the basis of device-independent color values, the RGB values of the captured image are converted into corresponding colorimetric values like L*a*b* values by using a scanner profile.

A scanner profile is created as follows. A color chart printed by a printer is measured with a scanner and a spectrocolorimeters. Then RGB values of patches of the color chart taken by a scanner are associated with colorimetric values like L*a*b* values of the patches taken by the spectrocolorimeters, as illustrated in FIG. 16, to create a scanner profile. However, measurements with a scanner sometimes lack consistency because of a change of the performance of the scanner with age and/or a change of the environmental condition, and it is preferable that a scanner profile is timely corrected.

A correction of a scanner profile uses a process of printing a color chart by a printer, and if a scanner profile is corrected during job processing, the processing of a job is suspended through the process of printing a color chart. In view of that, a conventional system is configured to monitor the number of printed sheets or the time elapsed from the prior correction, and print a color chart at the end of processing of a certain job after a judgement that the number or the time exceeds a predetermined threshold, or configured to change correction data to be used for color conversion, at the time of test printing (printing a proof).

However, in processing of a job containing a large amount of pages, the measured values taken by a scanner can be inconsistent during printing a large amount of pages, and under such a situation, it is difficult to correct a scanner profile appropriately with the above-described technique to print a color chart at the end of processing of a job. Further, with the technique to arrange patches in a blank space of a sheet for test printing, it is difficult to arrange all the patches necessary for correction of a scanner profile, in the blank space of the sheet. In particular, in a case that an apparatus configured to measure patches with an inline scanner and an in-line spectrocolorimeter in is used for the technique, it is necessary to arrange patches in a restricted part in a blank space of a sheet, which is measurable with the in-line spectrocolorimeter. It makes more difficult to arrange all the patches necessary for correction of a scanner profile, in a blank space of a sheet.

In view of that, there are provided a printer and operations for correcting a scanner profile to be executed by the printer or an apparatus in a printing system, as an embodiment of the present invention. The correction of a scanner profile is executed under the assumption that the scanner profile is corrected during processing of a job in the embodiment. In the correction of a scanner profile, at least one patch is printed together with each of images of a job, which are images of pages of the job to be reproduced on respective sheets, and a series of partial corrections of the scanner profile is executed during job processing, by using the patches printed on multiple sheets so that a sufficient part of the scanner profile can be corrected finally. In the operations for correcting a scanner profile, the printer or the apparatus may judge time to correct the scanner profile, as needed, by using measured values of blank spaces of printed sheets, which are the outside of areas where images of the job were printed, and then perform the correction of the scanner profile according to the judgement.

In concrete terms, there is provided a printer equipped with a print engine, an in-line scanner and an in-line spectrocolorimeter, or an apparatus for controlling a print engine, an in-line scanner and an in-line spectrocolorimeter. The hardware processor of the printer or the apparatus is configured to perform the following control operations. First, the hardware processor controls a patch arrangement for each of sheets where images of a job (corresponding to pages of the job) are separately to be printed by the print engine. In the process of controlling a patch arrangement, the hardware processor defines an arrangement of at least one patch, which is individually of at least one color, in a blank space of each of the sheets, where the least one color are chosen for each of the sheets successively from colors of a chart to be used for creating a scanner profile. According to the patch arrangement, the hardware processor instructs the print engine to print the at least one patch together with an image of the job on each of the sheets. The hardware processor then causes the in-line scanner and the in-line spectrocolorimeter to measure the at least one patch printed on each sheet. Each time when obtaining measurement results of the at least one patch printed on a sheet, from the in-line scanner and the in-line spectrocolorimeter, the hardware processor updates a part of data of the scanner profile, corresponding to the at least one color of the measured at least one patch, by using the obtained measured values of the at least one patch. For example, the hardware processor may create update data, which are data for updating grid point data of the scanner profile, corresponding to the at least one color, by using the obtained measured values of the at least one patch, and then correct the grid point data of the scanner profile by using the update data. The above-described control operations allow the printer or the apparatus to maintain the accuracy of a scanner profile without suspending job processing. Further, since a series of partial corrections of the scanner profile is executed in the above-described control operations, the above-described control operations can enhance the accuracy of the scanner profile even if a small number of patches are used for each partial correction.

In the process of controlling a patch arrangement, the hardware processor may determine colors used in the job, and choose the at least one color for each of the sheets successively from colors used in the job and contained in the colors of the chart. For choosing the at least one color for each of the sheets, the hardware processor may use all the colors of the chart repeatedly, or may use specific colors among the colors of the chart with a greater frequency than the rest of the colors of the chart. Further, in the process of controlling a patch arrangement, the hardware processor may define the arrangement of the at least one patch for each of all or a part of the sheets where images of a job are separately to be printed by the print engine.

The hardware processor may be further configured to cause the in-line scanner to take measurements of blank spaces of sheets where images of the job were separately printed, and before the process of controlling a patch arrangement for each of the sheets, judge the time necessary to correct the scanner profile on the basis of the a reference value of a blank space of one printed sheet, and a comparison value of a blank space of each of other printed sheets that the in-line scanner received after the one printed sheet, where the reference value and the comparison value are color values taken by the measurements of the blank spaces with the in-line scanner. That is, at the each time when obtaining the comparison value of the blank space, the hardware processor may compare a difference between the reference value and the obtained comparison value, with a predetermined threshold value. In response to judging that the difference exceeds the threshold value, the hardware processor may judge that a need to correct the scanner profile arises and perform the processes of controlling the patch arrangement and updating a part of data of the scanner profile. Further, during the correction of the scanner profile (in other words, the processes of controlling the patch arrangement and updating a part of data of the scanner profile), the hardware processor may make the above comparison (a comparison between a reference value of a blank space of one printed sheet and a comparison value of a blank space of each of the succeeding printed sheets), and in response to judging that the difference does not exceed the threshold value, instruct the print engine to skip printing of the at least one patch, and skip the updating of a part of data of the scanner profile. With these control operations, a scanner profile is timely corrected. It avoids deterioration of the accuracy of the scanner profile before it arises, without printing excessive patches and executing excessive correction of a scanner profile.

It should be noted that a profile means a color conversion table in this specification. Among various kinds of profile, ICC (International Color Consortium) profiles have been widely used not only in the printing industry but also in the IT industry, and serve as de facto standards substantially. In an ICC profile, input values of a lookup table are defined on the basis of the grid point number. In an example that each of R, G and B values is represented by a value in the range from 0 to 255 and the grid point number is set to six, the intervals of the input values are defined by dividing 255 by 5 (the grid point number minus one). Accordingly, each of the RGB values has any one of values of 0, 51, 102, 153, 204, and 255, and the lookup table includes $6^3$ (the cube of six) sets of input RGB values and corresponding sets of colorimetric values.

Embodiment 1

Figure 1:
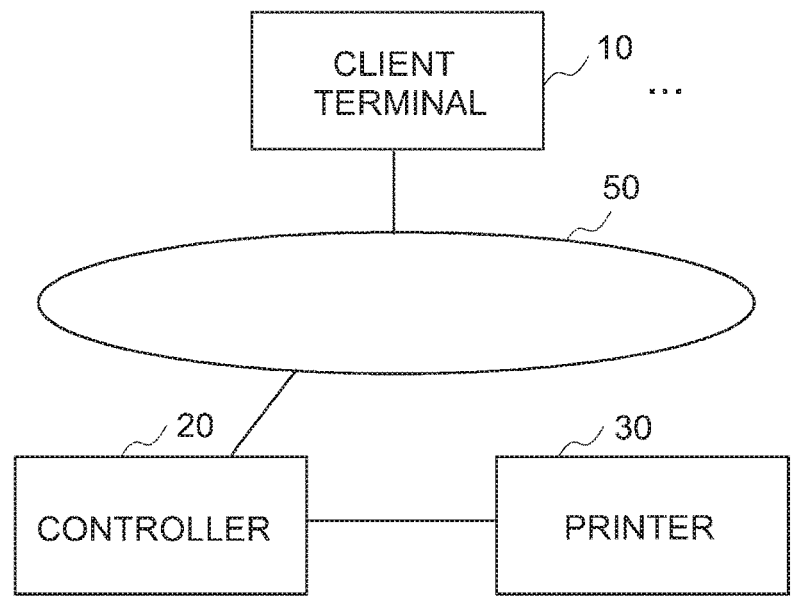
FIG. 1 is a schematic diagram illustrating an example of the constitution of a printing system according to the first embodiment.
Figure 2:
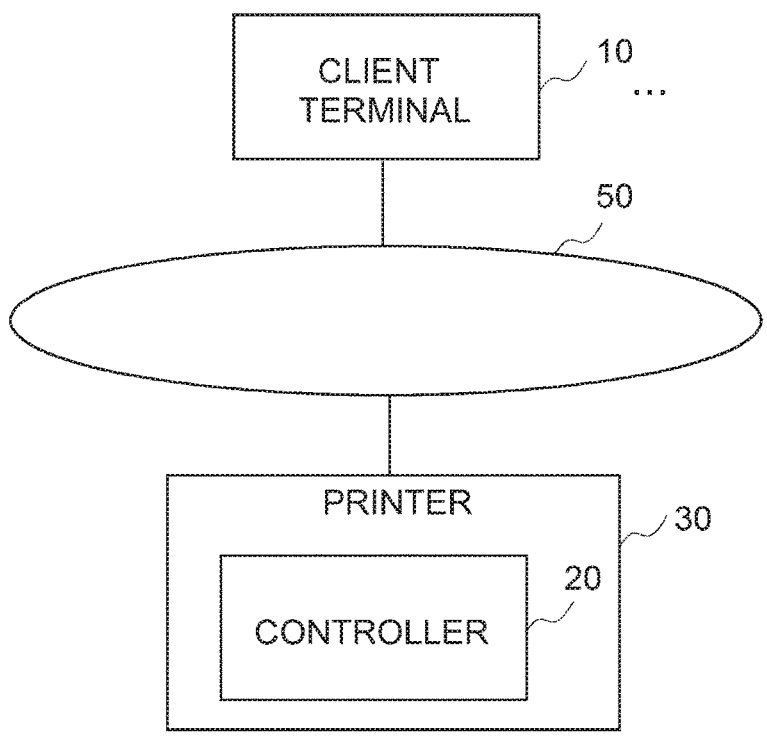
FIG. 2 is a schematic diagram illustrating another example of the constitution of the printing system according to the first embodiment.
Figure 3:
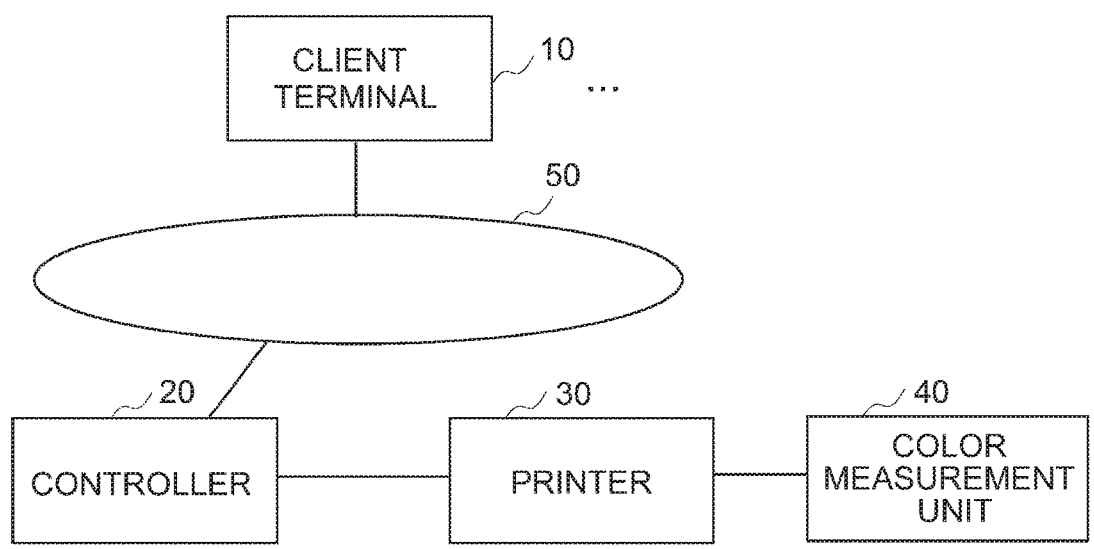
FIG. 3 is a schematic diagram illustrating another example of the constitution of the printing system according to the first embodiment.
Figure 4A:
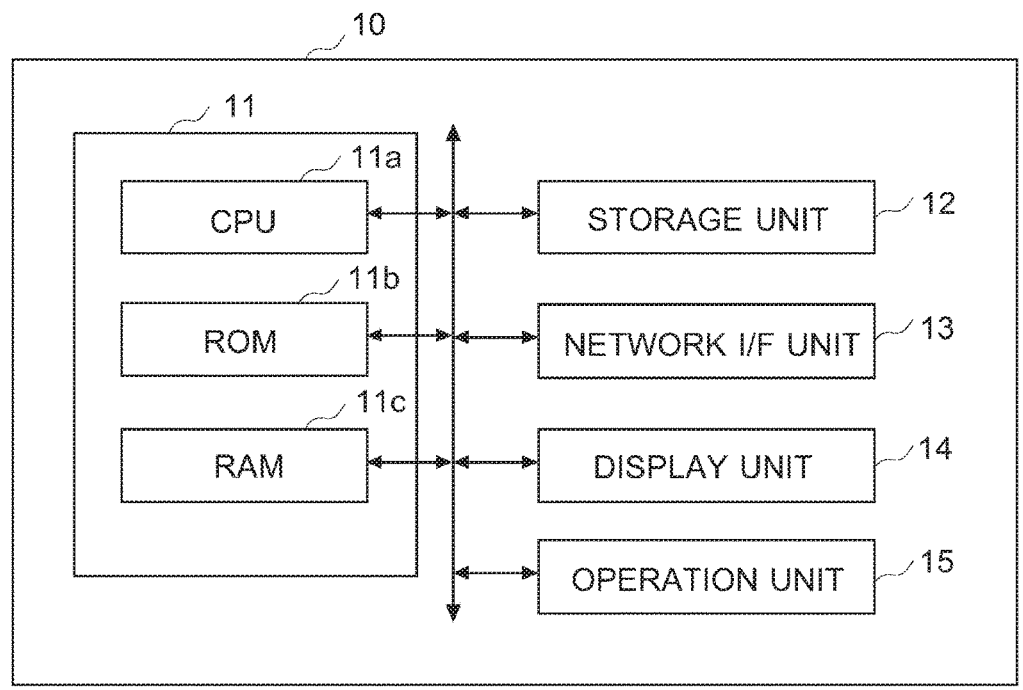
FIGS. 4A and 4B are block diagrams illustrating an example of the constitution of a client terminal according to the first embodiment.
Figure 4B:
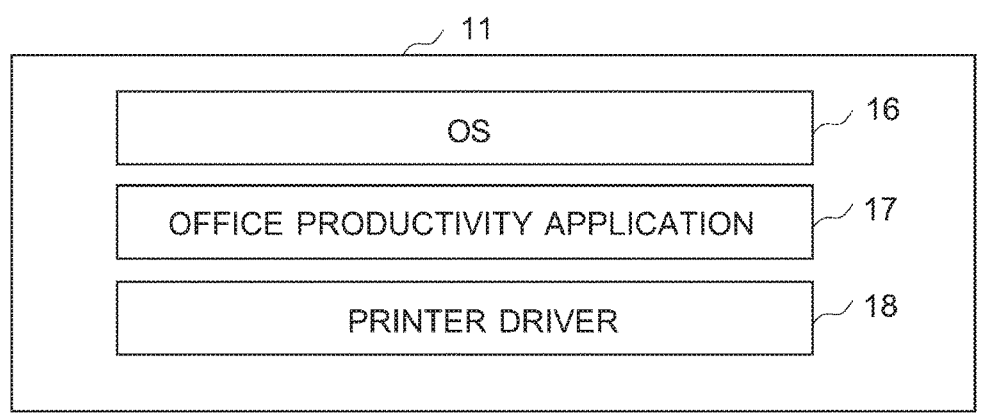
Figure 5A:
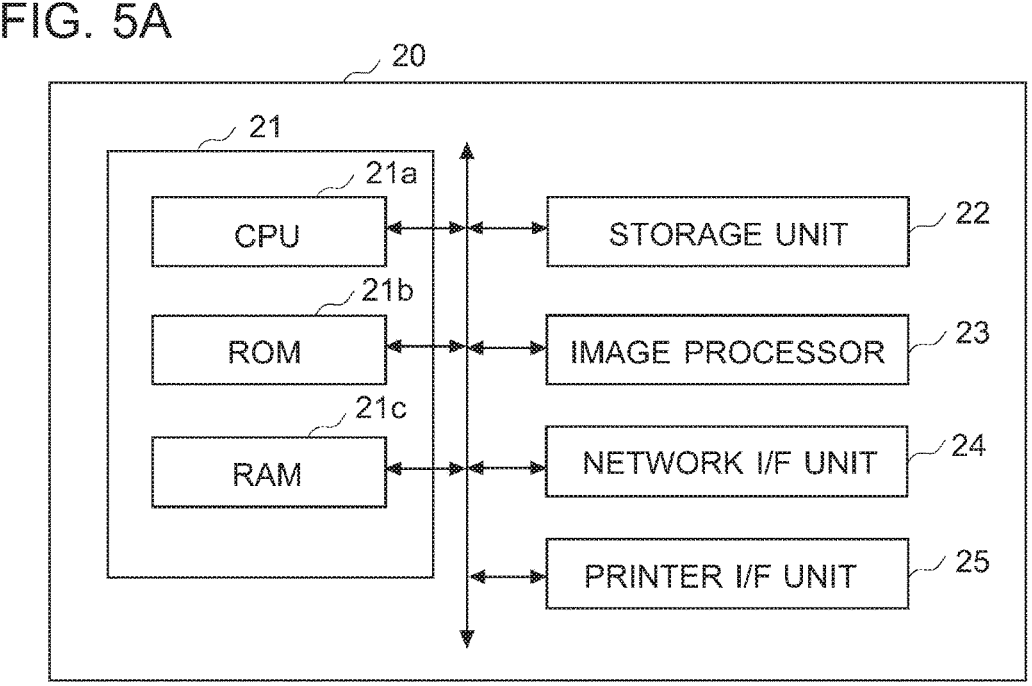
FIGS. 5A and 5B are block diagrams illustrating an example of the constitution of a controller according to the first embodiment.
Figure 5B:
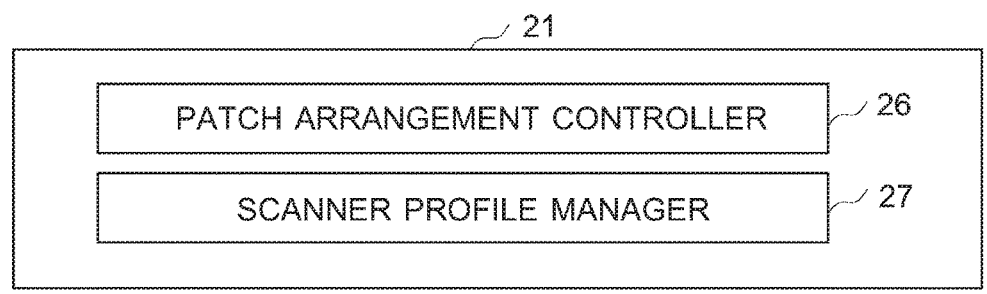
Figure 6:
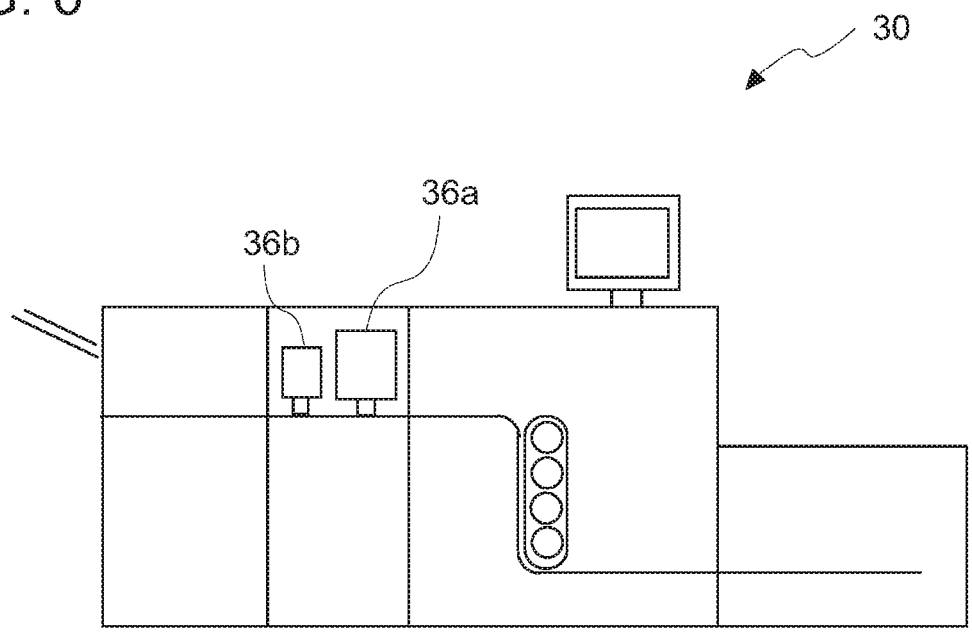
FIG. 6 is a schematic diagram illustrating an example of the constitution of a printer (which includes an in-line scanner and an in-line colorimeter) according to the first embodiment.
Figure 7A:
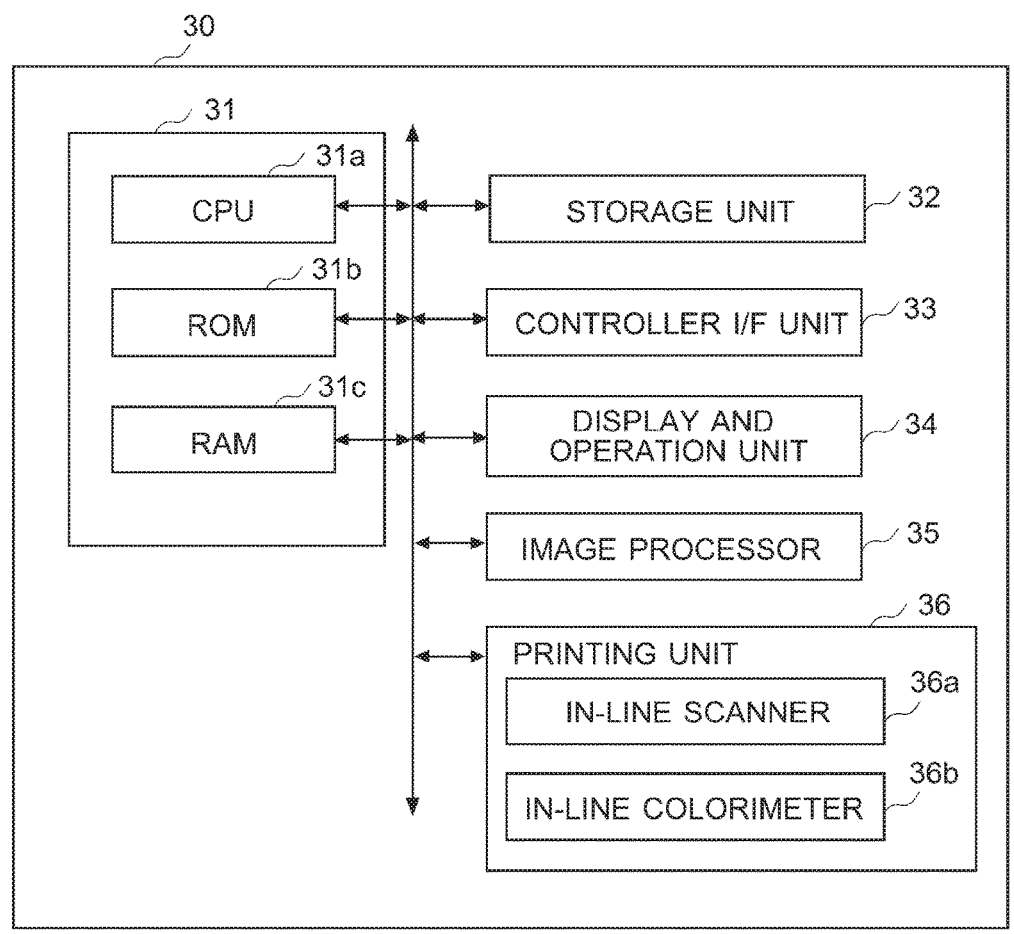
FIGS. 7A and 7B are block diagrams illustrating an example the constitution of a printer (which includes a controller, an in-line scanner and an in-line colorimeter) according to the first embodiment.
Figure 7B:
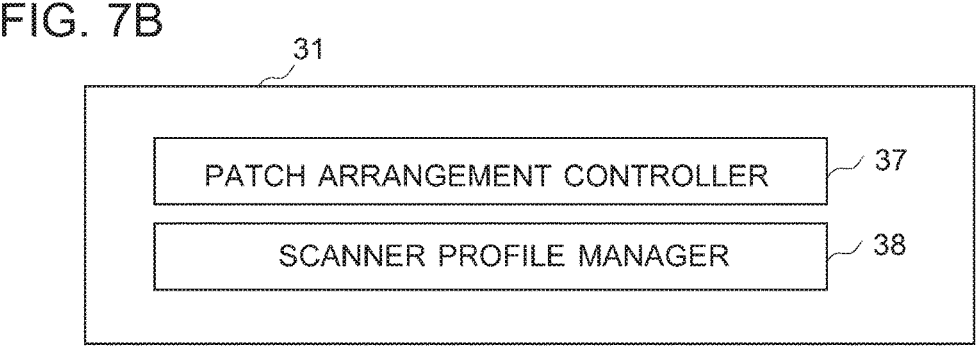
Figure 8:
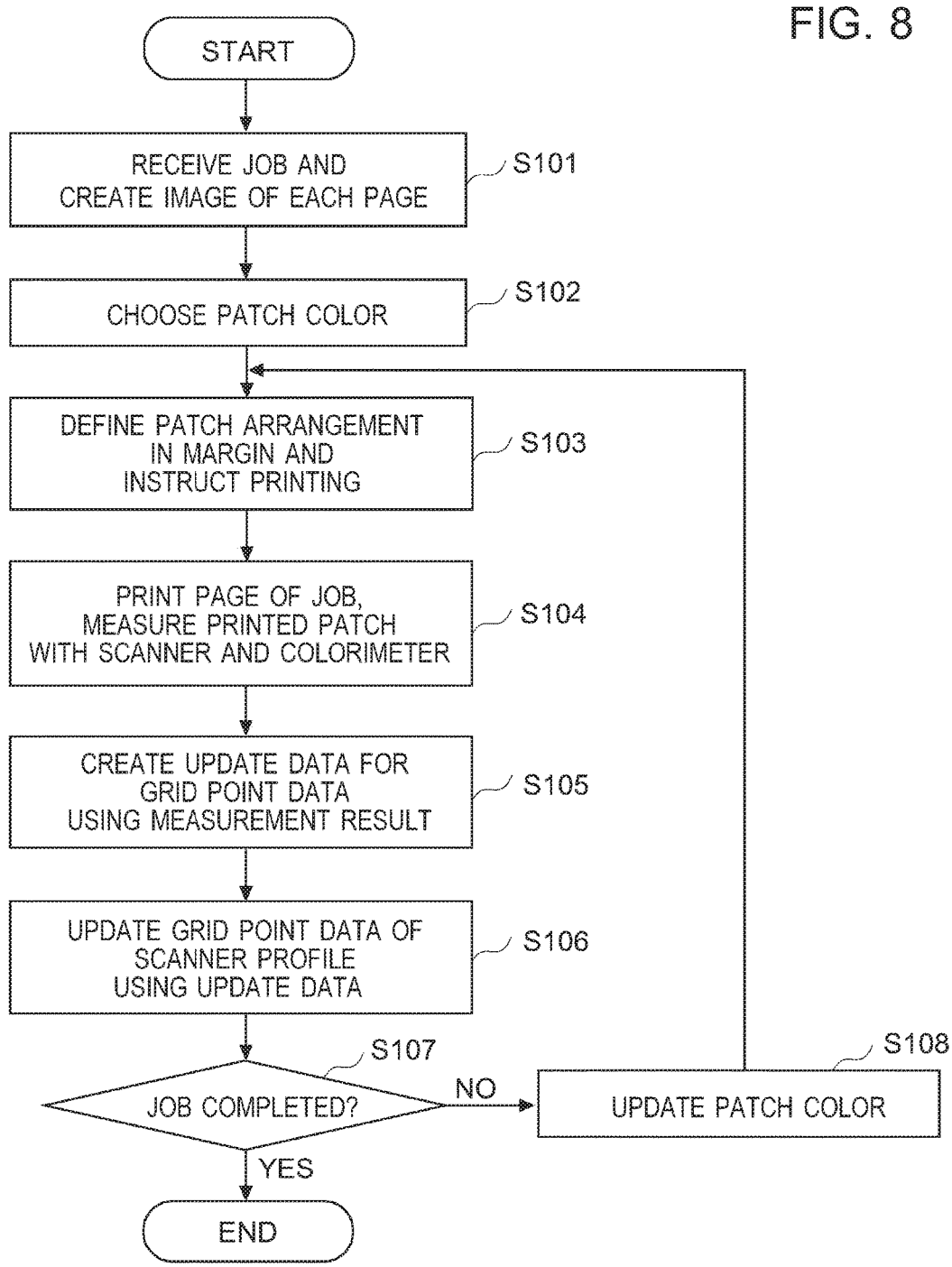
FIG. 8 is a flowchart illustrating an example of operations of the printer (which includes a controller, an in-line scanner and an in-line colorimeter) according to the first embodiment.
Figure 9:
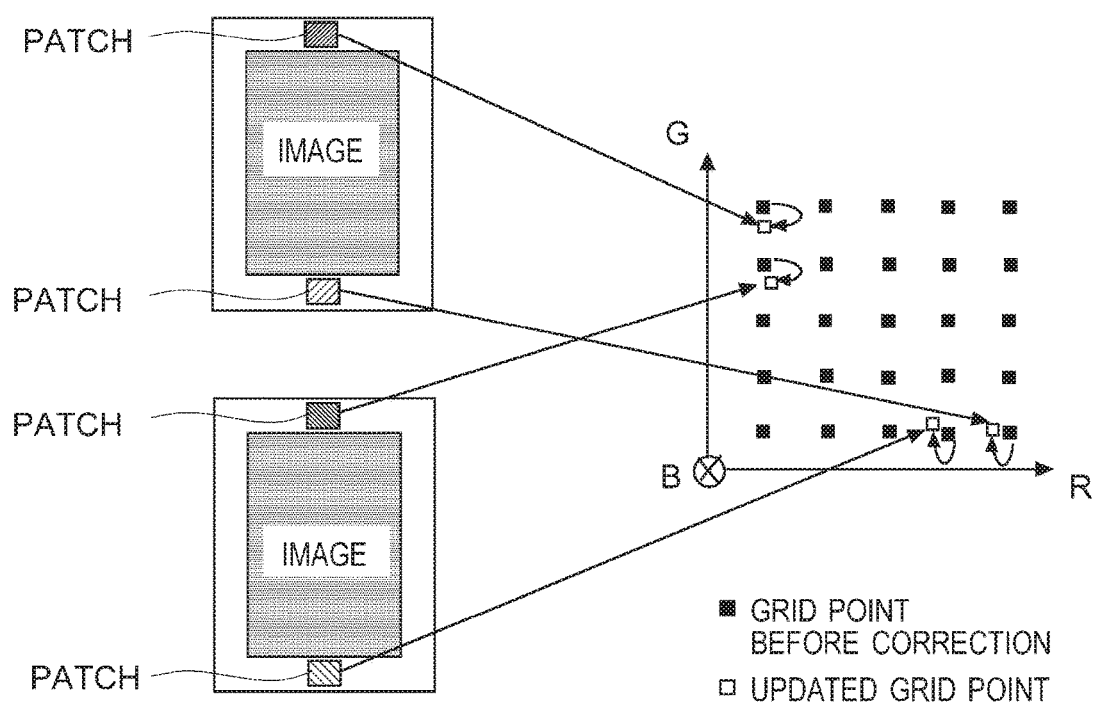
FIG. 9 is a schematic diagram illustrating an example of a method of correcting a scanner profile according to the first embodiment.

In order to describe an embodiment of the present invention in more in detail, a description is given of a printer, a non-transitory recording medium storing a scanner profile correction program and a scanner profile correction method, with reference to FIG. 1 through FIG. 9. Each of FIGS. 1 to 3 is a schematic diagram illustrating an example of the constitution of a printing system according to the present embodiment. FIGS. 4A and 4B are block diagrams illustrating an example the constitution of a client terminal according to the present embodiment. FIGS. 5A and 5B are block diagrams illustrating an example the constitution of a controller according to the present embodiment. FIG. 6 is a schematic diagram illustrating an example of the constitution of a printer (which includes an in-line scanner and an in-line colorimeter) according to the present embodiment. FIGS. 7A and 7B are block diagrams illustrating an example the constitution of a printer (which includes a controller, an in-line scanner and an in-line colorimeter) according to the present embodiment. FIG. 8 is a flowchart illustrating an example of operations of the printer (which includes a controller, an in-line scanner and an in-line colorimeter) according to the present embodiment. FIG. 9 is a schematic diagram illustrating an example of the method of correcting a scanner profile according to the present embodiment.

As illustrated in FIG. 1, a printing system according to the present embodiment includes at least one client terminal 10, controller 20 and printer 30 which are located in an intranet so that they can be communicatively connected to each other via communication network 50. As an example of the communication network 50, an Ethernet network may be used. Data transfer from controller 20 to printer 30 may be performed through a system conforming to the standards, such as IEEE 1394, parallel or the like, other than the Ethernet.

In the printing system illustrated in FIG. 1, controller 20 and printer 30 are prepared as separated apparatuses. Alternatively, the printing system may have the construction such that controller 20 is included in printer 30 as illustrated in FIG. 2. In the printing systems illustrated in FIGS. 1 and 2, printer 30 includes functions of a scanner and functions of a colorimeter. Alternatively, the printing system may have the construction such that color measurement unit 40 (including a scanner and a spectrocolorimeter) is prepared separately from printer 30 as illustrated in FIG. 3. Hereinafter, a description of each apparatus is given on the assumption of the structure of the printing system illustrated in FIG. 1.

Client Terminal:

Client terminal 10 is a computing device like a personal computer and is configured to create a job and send the job to controller 20. Client terminal 10 includes, as illustrated in FIG. 4A, built-in controller 11 and storage unit 12, network interface (I/F) unit 13, display unit 14 and operation unit 15.

Built-in controller 11 includes a CPU (Central Processing Unit) 11a as a hardware processor, and memories including ROM (Read Only Memory) 11b and a RAM (Random Access Memory) 11c. CPU 11a reads out control programs stored in the ROM 11b or the storage unit 12, loads the control programs onto RAM 11c, and executes the control programs, thereby controlling operations of the components of client terminal 10. Built-in controller 11 (CPU 11a) further executes, as illustrated in FIG. 4B, OS (Operating System) 16, office productivity applications 17 and printer driver 18 and other programs.

Examples of OS 16 include Windows, macOS and Android, where Windows is a registered trademark of Microsoft Corporation in the United States and/or other countries, macOS is a trademark of Apple Inc. in the U.S. and other countries, and Android is a trademark of Google Inc. in the United States and/or other countries. OS 16 manages office productivity applications 17 and printer driver 18 in the client terminal 10 so as to function and run the programs.

Examples of office productivity applications 17 include word processing, spreadsheet, and image processing programs. When sending print instructions, office productivity application 17 invokes printer driver 18 and transfers original data created by the office productivity application 17 to printer driver 18.

Printer driver 18 is a program that converts original data created by office productivity application 17 into a job written in a language that controller 20 can interpret, where examples of the print job include PDL (Page Description Language) data written in page description languages, such as PJL (Printer Job Language), PS (PostScript) and PCL (Printer Control Language) and PDF (Portable Document Format) data. Printer driver 18 adds information of conditions for creating images, which were set on a print setup screen of printer driver 18, to the job, by writing the information into a print ticket or the header of the job.

Storage unit 12 is a non-transitory computer-readable recording medium including a HDD (Hard Disk Drive) and/or a SSD (Solid State Drive), which stores programs which when being executed causes CPU 11a to control the components of client terminal 10, information about processing and functions of client terminal 10, original data created by office productivity application 17, a job created by printer driver 18 and other data.

Network I/F unit 13 includes a NIC (Network Interface Card) and/or a modem. The network I/F unit 13 communicatively connects client terminal 10 to communication network 50, to send a job to controller 20.

Display unit 14 includes a display like a LCD (liquid crystal display) or an OEL (organic electroluminescence) display, so as to display an original creation screen of office productivity application 17, a print setup screen for generating a print job of printer driver 18, and others.

Operation unit 15 includes input devices, such as a mouse and a keyboard, which allow an operator to perform various operations to create an original by using office productivity application 17 and to set print conditions by using printer driver 18.

Controller:

Controller 20 is an apparatus that controls printer 30. Controller 20 includes, as illustrated in FIG. 5A, built-in controller 21, storage unit 22, image processor 23 and network interface (I/F) unit 24 and printer interface (I/F) unit 25 and optionally includes a display unit and an operation unit.

Built-in controller 21 includes CPU 21a as a hardware processor, and memories including ROM 21b and RAM 21c. CPU 21a reads out control programs stored in the ROM 21b or the storage unit 22, loads the control programs onto RAM 21c, and executes the control programs, thereby controlling operations of the components of controller 20.

Storage unit 22 is a non-transitory computer-readable recording medium including a HDD and/or a SSD, which stores programs which when being executed causes CPU 21a to control the components of controller 20, a job received from client terminal 10, image data created on the basis of a job, various kinds of profile, data of charts to be used for creating various kinds of profile, information of mechanical conditions of printer 30, and other data.

Image processor 23 is configured to analyze a method of processing a job received from client terminal 10 (for example, PDL data) and instructions to create various kinds of image received from client terminal 10. Image processor 23 also serves as a RIP (raster image processor), and is configured to parse PDL data and rasterize pages of a job to create bitmap image data.

Network I/F unit 24 includes a NIC and/or a modem. Network I/F unit 24 communicatively connects controller 20 to communication network 50, so as to receive a job and other data from client terminal 10. Printer I/F unit 25 is a dedicated interface for connecting controller 20 to printer 30. Printer I/F unit 25 is configured to receive information of mechanical conditions from printer 30, send bitmap image data to printer 30 to instruct printer 30 to print the bitmap image data.

As illustrated in FIG. 5B, built-in controller 21 is configured to work as patch arrangement controller 26 and scanner profile manager 27.

Patch arrangement controller 26 is configured to perform the following operations, for each of printing sheets specified in a job. Patch arrangement controller 26 determines a blank space, which is to be created outside of an area where an image created from the job (for example, an image of a page of the job) is to be printed, of each of the sheets. Patch arrangement controller 26 chooses at least one color for each of the sheets successively from colors of a chart to be used for creating a scanner profile, and defines an arrangement of at least one patch of the at least one color in the blank space of each of the sheets. Patch arrangement controller 26 then instructs printer 30 to print the at least one patch together with an image of the job on each of the sheets.

Scanner profile manager 27 is configured to manage a scanner profile and perform the following operations. Scanner profile manager 27 obtains measured values of at least one patch printed in a blank space of a sheet, taken with a scanner and a spectralcolorimeter in color measurement unit 40 (or an in-line scanner and an in-line colorimeter that printer 30 is equipped with), where the measured values include a scanner value or values (referred to as an RGB value or values in the present embodiment) of the at least one patch each of which is a color value taken by a measurement with the scanner or in-line scanner, and a colorimeter value or values (referred to as a colorimetric value or values in the present embodiment) of the at least one patch each of which is a color value taken by a measurement with the spectralcolorimeter or in-line colorimeter. In response to obtaining the measured values, scanner profile manager 27 creates update data for grid point data of the scanner profile, by using the obtained measured values. Scanner profile manager 27 updates a part of the grid point data of the scanner profile, which corresponds to the at least one color of the measured at least one patch, by using the update data, to perform a partial correction of the scanner profile.

Herein, the above-mentioned patch arrangement controller 26 and scanner profile manager 27 may be constituted as hardware devices. Alternatively, the above-mentioned patch arrangement controller 26 and scanner profile manager 27 may be provided by a scanner profile correction program which causes built-in controller 21 to function as these sections when being executed by CPU 21a. That is, built-in controller 21 may be configured to serve as the patch arrangement controller 26 and scanner profile manager 27, when CPU 21a executes the scanner profile correction program.

Printer:

Printer 30 is an image forming apparatus like a MFP (multi-functional peripheral), and is configured to perform printing according to instructions given by controller 20. In the present embodiment, printer 30 is equipped with, as illustrated in FIG. 6, in-line scanner 36a and in-line colorimeter 36b arranged along the sheet path where printing sheets are conveyed. As illustrated in FIG. 7A, printer 30 includes built-in controller 31, storage unit 32, controller interface (I/F) unit 33, display and operation unit 34, image processor 35 and printing unit 36.

Built-in controller 31 includes CPU 31a as a hardware processor, and memories including ROM 31b and RAM 31c. CPU 31a reads out control programs stored in ROM 31b or storage unit 32, loads the control programs onto RAM 31c, and executes the control programs, thereby controlling operations of the components of printer 30.

Storage unit 32 is a non-transitory computer-readable recording medium including a HDD and/or a SSD. Storage unit 32 stores programs which, when being executed, cause CPU 31a to control the components of printer 30; information about processing and functions of printer 30; scanner profiles and printer profiles; data of charts to be used for creating scanner profiles and printer profiles; and other data.

Controller I/F unit 33 is a dedicated interface for connecting printer 30 to controller 20. Controller I/F unit 33 is configured to receive image data and other data from client terminal 10. If printer 30 is configured to work as controller 20, controller I/F unit 33 is configured to receive a job from client terminal 10.

Display and operation unit 34 is configured to display various screens relating to printing and allow an operator to perform, on the screens, various operations relating to printing. Examples of the display and operation unit 34 include a touch screen in which a pressure-sensitive operation unit (a touch sensor) composed of lattice-shaped transparent electrodes is arranged on a display unit.

Printer 30 includes image processor 35, if the printer 30 is configured to work as controller 20. Image processor 35 is configured to analyze a method of processing a job received from client terminal 10 (for example, PDL data) and instructions to create various kinds of image received from client terminal 10. Image processor 35 is further configured to parse PDL data, rasterize pages of a job to create bitmap image data, and send the created image data to printing unit 36.

Printing unit 36 (print engine) is configured to perform printing by using image data. In concrete terms, printing unit 36 includes an exposure unit, a photoreceptor drum, a charging unit, a developing unit, a transfer belt, a fixing unit and so on, and performs following processes. That is, the exposure unit performs exposure processing by irradiating the photoreceptor drum, which was charged by the charging unit, with a laser beam in accordance with an image, to form a latent image on the photoreceptor drum. The developing unit develops the latent image by adhering charged toner onto the photoreceptor drum, and the developed toner image is transferred onto the transfer belt (first transfer processing), further is transferred from the transfer belt onto a sheet for printing (second transfer processing), and is fixed onto the sheet by the fixing unit. If printer 30 has functions of color measurement unit 40, printing unit 36 further includes in-line scanner 36a and in-line colorimeter 36b.

In-line scanner 36a includes, for example, three kinds of sensors for RGB colors, and is configured to scan the whole face of a printed matter with the RGB sensors and output RGB values as a measurement result.

In-line colorimeter 36b is, for example, a measurement device supporting spectrophotometry (spectrocolorimeter) capable of measuring the light intensity at each wavelength. In-line colorimeter 36b is configured to measure the color of the measurable area of a face of a printed matter, which is an area at almost the middle of the face in the main scanning direction of in-line scanner 36a (or the cross machine direction of printer 30), and output colorimetric values (L*a*b* values, XYZ values, or color values in a device-independent color space) as a measurement result.

If printer 30 also serves as controller 20, built-in controller 31 may be configured to, as illustrated in FIG. 7B, work as patch arrangement controller 37 and scanner profile manager 38.

Patch arrangement controller 37 is configured to perform the following operations, for each of printing sheets specified in a job. Patch arrangement controller 37 determines a blank space, which is to be created outside of an area where an image created from the job is to be printed, of each of the sheets. Patch arrangement controller 37 chooses at least one color for each of the sheets successively from colors of a chart to be used for creating a scanner profile, and defines an arrangement of at least one patch of the at least one color in the blank space of each of the sheets (in an area at almost the middle of a face of the sheet in the cross-machine direction of printer 30 or the main scanning direction of in-line scanner 36a, which can be measured by in-line colorimeter 36b). Patch arrangement controller 37 then instructs printing unit 36 to print the at least one patch together with an image of the job on each of the sheets.

Scanner profile manager 38 is configured to manage a scanner profile and perform the following operations. Scanner profile manager 38 obtains an RGB value or values of at least one patch printed in a blank space of a sheet, taken with in-line scanner 36a and a colorimetric value or values of the at least one patch, taken with in-line colorimeter 36b. In response to obtaining the measured values, scanner profile manager 38 creates update data for grid point data of the scanner profile, by using the obtained measured values. Scanner profile manager 38 updates a part of the grid point data of the scanner profile, which corresponds to the at least one color of the measured at least one patch, by using the update data, to perform a partial correction of the scanner profile.

Herein, the above-mentioned patch arrangement controller 37 and scanner profile manager 38 may be constituted as hardware devices. Alternatively, the above-mentioned patch arrangement controller 37 and scanner profile manager 38 may be provided by a scanner profile correction program which causes built-in controller 31 to function as these sections when being executed by CPU 31a. That is, built-in controller 31 may be configured to serve as the patch arrangement controller 37 and scanner profile manager 38, when CPU 31a executes the scanner profile correction program.

It should be noted that FIG. 1 to FIG. 7B illustrate the printing system according to the present embodiment for illustrative purpose only, and the constitution may be modified appropriately.

As described above, color measurements taken with a scanner and a colorimeter is necessary for a correction of a scanner profile. It restricts the number of patches which can be arranged in a blank space of each sheet and increases the number of sheets on which patches are to be printed together with images of pages of a job, necessary for obtaining enough data for a sufficient correction. It takes a lot of time to correct a scanner profile. In view of that, in the printing system according to the present embodiment, at least one color patch is printed in the upper margin and/or the lower margin of each of sheets where images of pages of a job are to be printed separately, and the at least one patch printed on each sheet is measured with a scanner and a spectrocolorimeter (an in-line scanner and an in-line colorimeter). In response to obtaining measured values of the at least one patch printed on each sheet from the scanner and the spectrocolorimeter (the in-line scanner and the in-line colorimeter), printer 30 or controller 20 then associates the measurement result (for example, RGB values) taken with the scanner (or the in-line scanner) with the measurement result (for example, L*a*b* values) taken with the spectrocolorimeter (or the in-line colorimeter) to create update data for correcting grid point data of a scanner profile. Printer 30 or controller 20 then uses the update data to update a part of the grid point data, which corresponds to the color or colors of the at least patch measured, so as to partially correct the scanner profile. In other words, in the present embodiment, printer 30 or controller 20 performs a partial correction of the scanner profile at each time when the printer 30 or controller 20 obtains measured values of the at least one patch printed on a sheet (in a margin of a page of a job), so as to perform a series of a partial correction of the scanner profile by using patches printed in the blank spaces of multiple sheets.

If this correction method is applied to a correction of a printer profile, it may bring deterioration of the gradation expression of images. When printed matters are given by printing images on which color conversion was performed, the gradation expression of the printed matters gets so worse that an observer can perceive the deterioration of the gradation expression. On the other hand, in a case that a scanner profile is used for an inspection of printed matters, even if color conversion using a partially corrected scanner profile makes a discontinuity of L*a*b* values, such a discontinuity will not cause a problem because there is no need to print images on which the color conversion was performed in this case.

Hereinafter, a description is given of operations of the printing system according to the present embodiment. The descriptions is given under the assumption that the printing system employs printer 30 illustrated in FIGS. 7A and 7B. That is, the printer 30 also serves as controller 20 (in other words, built-in controller 31 of printer 30 works as patch management controller 37 and scanner profile manager 38), and printing unit 36 of printer 30 includes in-line scanner 36a and in-line colorimeter 36b. CPU 31a reads out a scanner profile correction program stored in ROM 31b or storage unit 32, loads the program onto RAM 31c, and executes the program, thereby executing the steps of the flowchart illustrated in FIG. 8.

First, built-in controller 31 receives a job sent from client terminal 10, and image processor 35 analyzes the received job and rasterizes pages of the job to create an image of each page (Step S101). Next, built-in controller 31 (patch arrangement controller 37) chooses at least one color for at least one patch to be printed in a blank space to be created in each of sheets where the pages of the job are to be printed, successively from colors of a chart to be used for creating a scanner profile (Step S102). Built-in controller 31 (patch arrangement controller 37) then defines an arrangement of at least one patch of the at least one color chosen for one sheet, in a blank space of the sheet (in this embodiment, in the upper margin and the lower margin of the sheet), and instructs printing unit 36 to print the at least one patch together with an image of a page of the job (Step S103).

In an example that the total number of colors corresponding to grid points of a scanner profile is represented by "n" and two patches are arranged in a blank space of each of sheets where pages of the job are to be separately printed (in this case, one patch is arranged in the upper margin and the other patch is arranged in the lower margin of each sheet), built-in controller 31 (patch arrangement controller 37) chooses the first and second colors for the first page, the third and fourth colors for the second page, . . . and the (n−1)-th and n-th colors for the (n/2)-th page, from the colors of a chart to be used for creating the scanner profile. In this process, built-in controller 31 (patch arrangement controller 37) may choose at least one color for each page in order, or may fix the order of priority for the colors of the chart to be used for creating the scanner profile (for example, so that specific colors, such as colors corresponding to the boundary of the color gamut of the scanner profile, have high priorities) and choose at least one color for each page from the colors of the chart, according to the order of priority. Further in the process of choosing patch color, built-in controller 31 (patch arrangement controller 37) may use all the colors of the chart repeatedly for choosing at least one colors for each page (for example, choose the first and second colors for the (n/2+1) page) or may use specific colors among the colors of the chart with greater frequency than the rest of the colors of the chart, for choosing at least one color for each page (for example, choose colors for each page so that every specific color, such as colors corresponding to the boundary of the color gamut of the scanner profile, is chosen with a 50 percent probability or so that one out of every two chosen colors is the specific color).

In the present embodiment, it is preferable that at least one patch is arranged in a margin of each page of a job, but there is no need to arrange at least one patch is arranged in a margin of each of all the pages of the job. Alternatively, the patches may be arranged in a manner that at least one patch is arranged in a blank space of each of sheets selected from the sheets on which images of a job are separately to be printed. For example, the patches may be arranged in a manner that at least one patch is arranged in a margin of each of the first several pages of the job and no patch is arranged in a margin of each of the remaining pages; or in a manner that at least one patch is arranged in a margin of every several page.

Built-in controller 31 (patch arrangement controller 37) according to the present embodiment arranges a patch at almost the center of each of the upper margin and the lower margin of each page, but the arrangement of the patches may be modified as far as at least one patch is arranged in an area where in-line colorimeter 36b can measure, in a blank space of a sheet. Further, built-in controller 31 (patch arrangement controller 37) according to the present embodiment arranges one patch in each of the upper margin and the lower margin of each page, but an arbitrary number of patches may be arranged in each margin. For example, if the upper margin and the lower margin of each page have sufficient spaces, an array of patches may be arranged in each of the margins. Further, the patches may be of arbitrary size and the size of the patches may change according to the speed of sheet conveyance.

Next, printing unit 36 prints an image of a page and the patches on a sheet according to instructions given from patch arrangement controller 37, and in-line scanner 36a and in-line colorimeter 36b measures the patches printed on the sheet to obtain RGB values and colorimetric values (Step S104).

In response to obtaining RGB values from in-line scanner 36a and obtaining colorimetric values from in-line colorimeter 36b, built-in controller 31 (scanner profile manager 38) creates update data for grid point data of the scanner profile by using the obtained RGB values and colorimetric values (Step S105), and updates a part of the grid point data, corresponding to the colors of the measured patches, using the update data (Step S106). FIG. 9 schematically illustrates an example of the method of correcting a scanner profile. As illustrated in the left half of the figure, patches are printed together with an image representing a page of a job on each sheet. The right half of the figure illustrates grid points of a scanner profile at which RGB values (in this figure, RG values) and corresponding colorimetric values are associated with each other, where grid points in the RG plane before color correction are represented by black square marks and updated grid points are represented by white square marks. Built-in controller 31 (scanner profile manager 38) corrects the scanner profile by replacing a part of the grid point data before color correction with the update grid point data which associates the RGB values and corresponding colorimetric values taken by measurements of the printed patches illustrated in the left half of FIG. 9 (please see the white square marks in FIG. 9).

After the updating process, built-in controller 31 judges whether processing for all the pages of the job has been completed (Step S107). On judging that there is at least one unprocessed page (NO in Step S107), built-in controller 31 (patch arrangement controller 37) updates patch color (choose at least one patch color for the next page) (Step S108), and returns to Step S103 to performs the succeeding processes.

The above description was given under the assumption that the printing system has the construction illustrated in FIG. 2. In a case that the printing system has the construction that controller 20 controls printed 30 as illustrated in FIG. 1, controller 20 (built-in controller 21) executes the steps of the flowchart of FIG. 8 other than Step S104. In another case that the printing system includes color measurement unit 40 separately from printer 30 as illustrated in FIG. 3, color measurement unit 40 executes the measurement process in Step S104.

As described above, the correction of a scanner profile includes the operations of defining an arrangement of at least one patch, which is of at least one color chosen from colors of the chart to be used for a scanner profile creation, in a blank space of each of sheets where images of pages of a job are separately to be printed; instructing the print engine to print the at least one patch together with an image of each page of the job, and using RGB values and colorimetric values taken by measurements of the at least one patch printed on each sheet to update a part of grid point data (corresponding to grid points representing the colors of the measured patches) of the scanner profile. Such operations maintain the accuracy of the scanner profile without suspending processing of a job. Since a series of partial connections is performed on a scanner profile, it enhances the accuracy of the scanner profile by using a small number of patches printed on each sheet.

Embodiment 2

Figure 10:
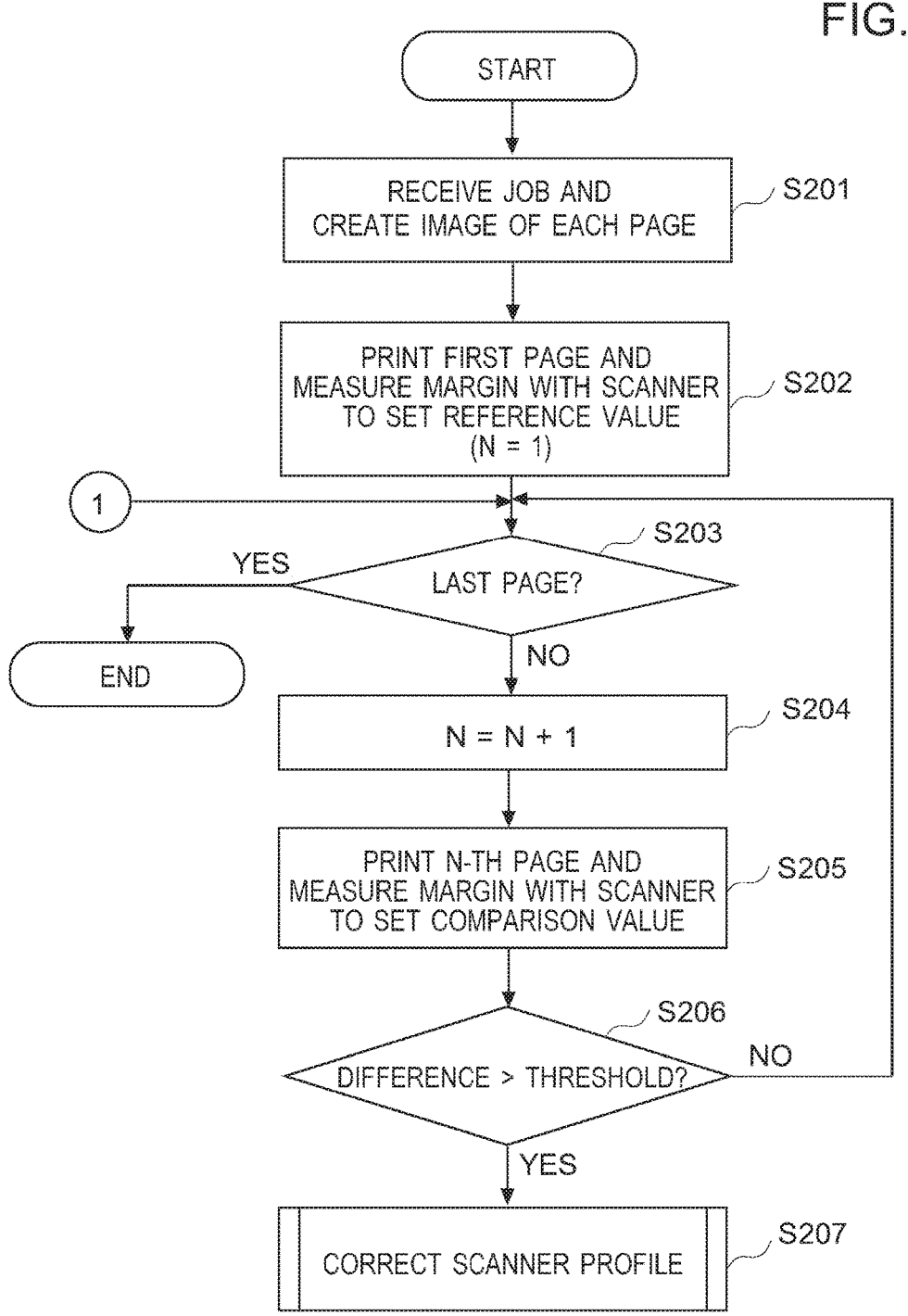
FIG. 10 is a flowchart illustrating an example of operations of a printer (which includes a controller, an in-line scanner and an in-line colorimeter) according to the second embodiment.
Figure 11:
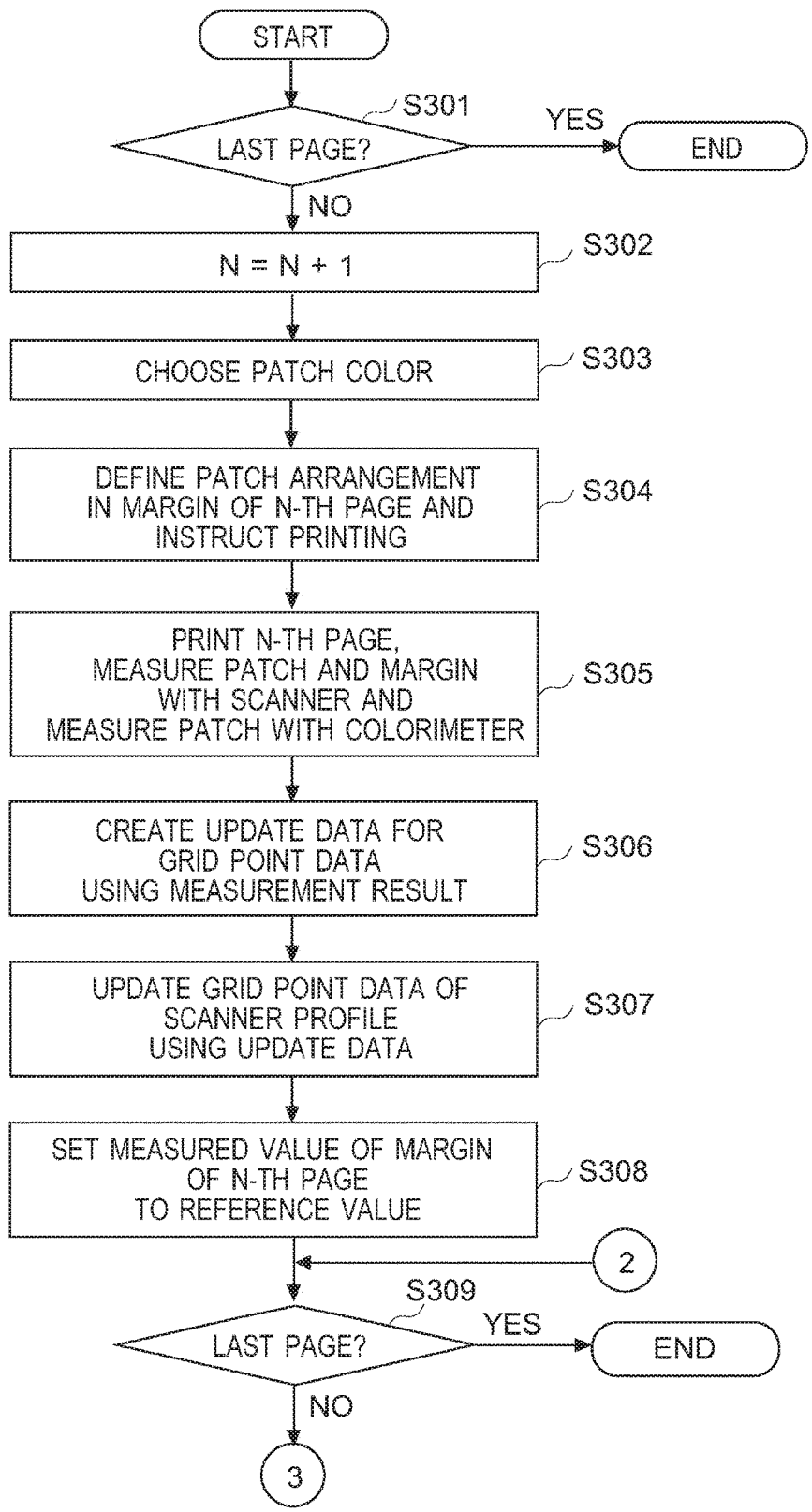
FIGS. 11 and 12 are flowcharts illustrating an example of operations (correction of a scanner profile) of the printer (which includes a controller, an in-line scanner and an in-line colorimeter) according to the second embodiment.
Figure 12:
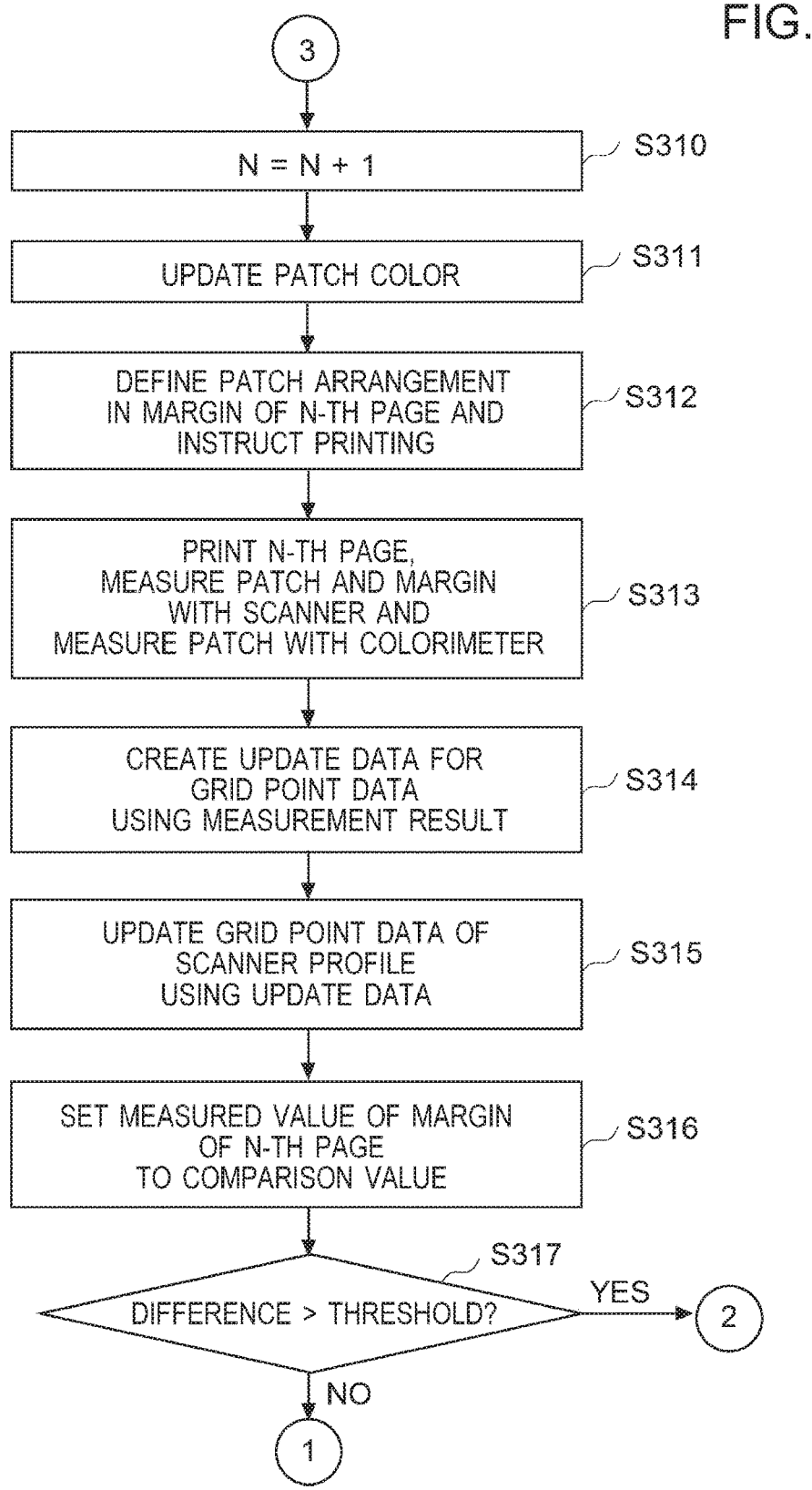
Figure 13:
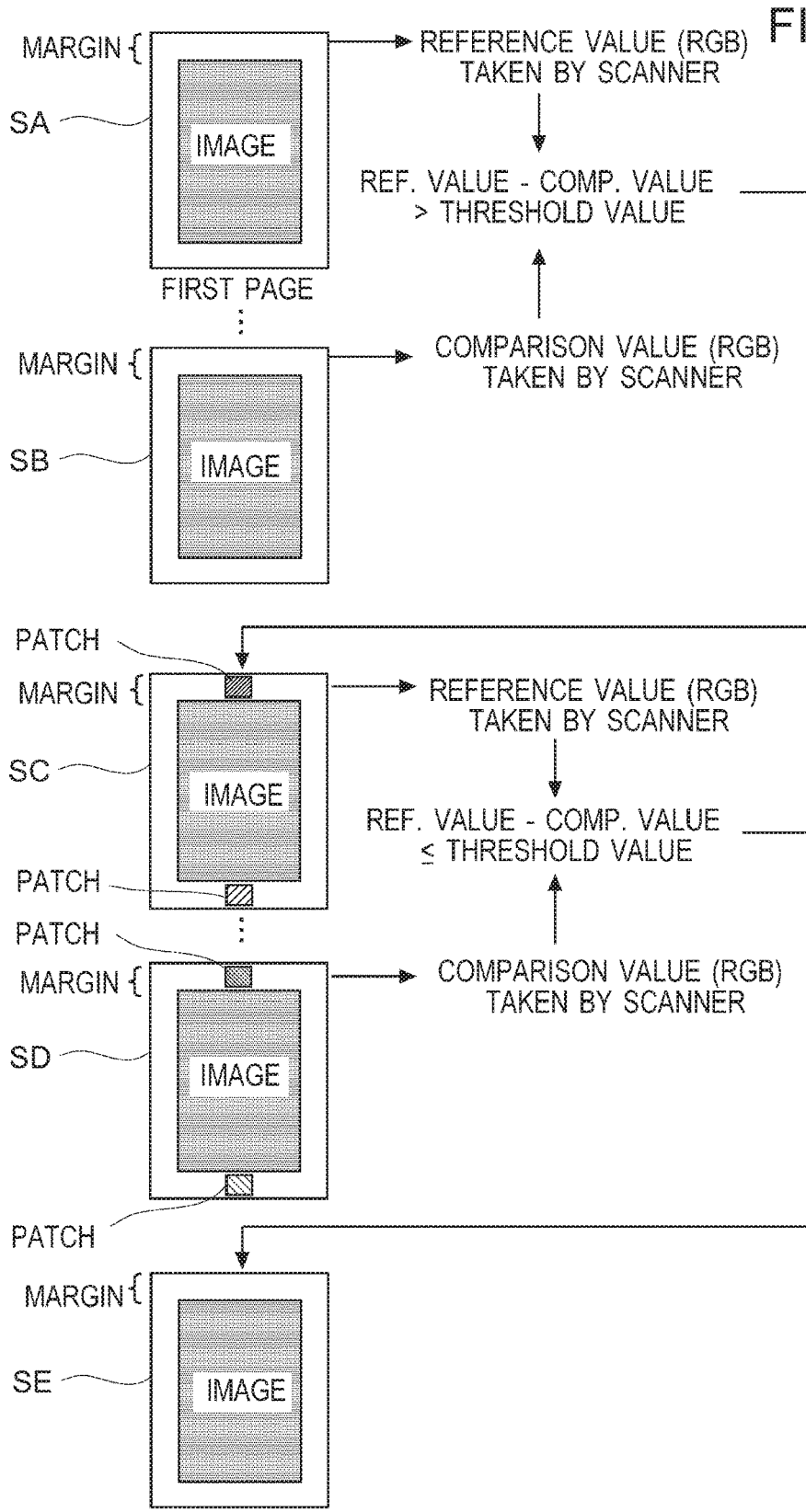
FIG. 13 is a schematic diagram illustrating an example of a method of correcting a scanner profile according to the second embodiment.

Next, a printer, a non-transitory recording medium storing a scanner profile correction program and a scanner profile correction method, with reference to FIG. 10 through FIG. 13. FIG. 10 and FIGS. 11 and 12 are flowcharts illustrating an example of operations of a printer (which includes a controller, an in-line scanner and an in-line colorimeter) according to the present embodiment. FIG. 13 is a schematic diagram illustrating an example of a method of correcting a scanner profile according to the present embodiment.

In Embodiment 1, the description was given of the operations to correct a scanner profile by arranging at least one patch in a blank space of each of sheets where pages of a job are separately to be printed. In the present embodiment, the following operations are executed for avoiding printing and measuring the patches in the condition that there is no need to correct a scanner profile. That is, printer 30 or controller 20 judges a need of the correction of a scanner profile by using measurement results of blank spaces of multiple sheets, and when judging that there is a need of the correction of a scanner profile, defines an arrangement of at least one patch for each of the succeeding sheets where the pages of a job are separately to be printed.

In the following operations, the basic construction of the printing system is almost the same as that shown in Embodiment 1, but scanner profile manager 27 of controller 20 or scanner profile manager 38 of printer 30 is further configured to perform the following operations. That is, scanner profile manager 27 or scanner profile manager 38 obtains an RGB value taken by a measurement of a position in a blank space of one sheet (for example, the first sheet received by a scanner), on which a page of the job was printed, with the scanner or in-line scanner, and defines and stores the obtained RGB value as a reference value. Scanner profile manager 27 or scanner profile manager 38 further obtains an RGB value taken by a measurement of the same position in a blank space of each of the succeeding sheets (that the scanner or in-line scanner received after the one sheet), and defines the obtained RGB value as a comparison value. When obtaining a comparison value taken from each of the succeeding sheets, scanner profile manager 27 or scanner profile manager 38 compares the comparison value with the reference value. In response to judging that the difference between the reference value and the comparison value exceeds a predetermined threshold value, scanner profile manager 27 or scanner profile manager 38 judges that a need to correct a scanner profile arises because of a change of the conditions of the scanner or in-line scanner, and causes patch arrangement controller 26 or patch arrangement controller 37 to define an arrangement of at least one patch in a blank space of each of succeeding sheets, to instruct printing unit 36 to print the at least one patch together with an image of a page of the job. Scanner profile manager 27 or scanner profile manager 38 then starts updating the data of the scanner profile on the basis of measured values of the at least one patches printed on each of the succeeding sheets.

Hereinafter, a description is given of operations of the printing system according to the present embodiment. Similarly to Embodiment 1, the description is given under the assumption that the printing system employs printer 30 illustrated in FIGS. 7A and 7B. That is, the printer 30 also serves as controller 20 (in other words, built-in controller 31 of printer 30 is configured to work as patch management controller 37 and scanner profile manager 38), and printing unit 36 of printer 30 includes in-line scanner 36a and in-line colorimeter 36b. CPU 31a reads out a scanner profile correction program stored in ROM 31b or storage unit 32, loads the program onto RAM 31c, and executes the program, thereby executing the steps of the flowcharts illustrated in FIG. 10 and FIGS. 11 and 12.

As illustrated in FIG. 10, built-in controller 31 receives a job sent from client terminal 10, and image processor 35 analyzes the received job and rasterizes pages of the job to create an image of each page to be output to printing unit 36 (Step S201).

Next, printing unit 36 sets the number N of the currently processed page to one (N=1), prints the first page of the job, and in-line scanner 36a takes a color measurement of a margin of the first page. Built-in controller 31 (scanner profile manager 38) sets the measured value (an RGB value of a certain point in the margin or the integrated value of the RGB values taken by measuring throughout the margin) taken with in-line scanner 36a, as a reference value (Step S202, please see sheet SA illustrated in FIG. 13). Next, built-in controller 31 judges whether the current page is the last page (Step S203). On judging that the current page is the last page (YES in Step S203), built-in controller 31 ends the job processing. On judging that the current page is not the last page (NO in Step S203), built-in controller 31 increments the number of pages N by 1 (Step S204). Printing unit 36 then prints the N-th page of the job on a printing sheet and in-line scanner 36a measures a margin of the N-th page printed on the sheet. Built-in controller 31 (scanner profile manager 38) sets the measured value (an RGB value of a certain point in the margin or the integrated value of the RGB values taken by measuring throughout the margin) taken with in-line scanner 36a, as a comparison value (Step S205, please see sheet SB illustrated in FIG. 13).

Built-in controller 31 (scanner profile manager 38) subtracts the comparison value from the reference value to obtain the difference between the two values, and judges whether the difference exceeds a predetermined threshold value (Step S206). On judging that the difference does not exceed (is equal to or less than) the threshold value (NO in Step S206), built-in controller 31 judges that a change of the scanner conditions does not arise and there is no need to correct the scanner profile, and returns to Step S203 to perform the succeeding processes. On the other hand, on judging that the difference exceeds the threshold value (YES in Step S206), built-in controller 31 performs the correction of the scanner profile (arranging and printing at least one patch in a blank space of each sheet and updating data of the scanner profile) in the same manner as that of Embodiment 1 (Step S207).

FIGS. 11 and 12 illustrates the operations of the correction of the scanner profile in detail. Built-in controller 31 judges whether the current page is the last page (Step S301). On judging that the current page is the last page (YES in Step S301), built-in controller 31 ends the job processing. On judging that the current page is not the last page (NO in Step S301), built-in controller 31 increments the number of pages N by 1 (Step S302). Built-in controller 31 (patch arrangement controller 37) gets data of a chart to be used for creating a scanner profile, and chooses at least one color for at least one patch (for example, two colors for two patches) to be printed in a blank space of the N-th page of the job, from colors contained in the chart (Step S303). Built-in controller 31 (patch arrangement controller 37) then defines an arrangement of patches of the chosen colors in the upper margin and the lower margin of the N-th page to be printed, and instructs printing unit 36 to print the patches together with an image of the N-th page (Step S304). In the process of choosing patch color, built-in controller 31 (patch arrangement controller 37) may choose at least one patch color for each page in order from the colors of the chart to be used for creating the scanner profile, or may fix the order of priority for the colors of the chart and choose at least one patch color for each page from the colors of the chart, according to the order of priority. Further in the process of choosing patch color, built-in controller 31 (patch arrangement controller 37) may use all the colors of the chart repeatedly for choosing at least one patch colors for each page or may use specific colors among the colors of the chart with greater frequency than the rest of the colors of the chart, for choosing at least one patch color for each page. Further in the process of choosing patch color, the arrangement of patches may be modified as far as at least one patch is arranged in an area where in-line colorimeter 36b can measure in a blank space of a sheet. Further, built-in controller 31 (patch arrangement controller 37) may arrange an arbitrary number of patches in a blank space of each sheet, in accordance with the size of the blank space or the size of the patches.

Next, printing unit 36 prints an image of the N-th page and the patches on a sheet according to instructions given from patch arrangement controller 37. In-line scanner 36a measures the patches printed on the sheet and a margin of the page printed on the sheet to obtain RGB values, and in-line colorimeter 36b measures the patches printed on the sheet to obtain colorimetric values (Step S305).

In response to obtaining RGB values from in-line scanner 36a and obtaining colorimetric values from in-line colorimeter 36b, built-in controller 31 (scanner profile manager 38) creates update data for grid point data of the scanner profile by using the obtained RGB values and colorimetric values of the patches (Step S306), and updates a part of the grid point data, corresponding to the colors of the measured patches, using the update data (Step S307). Built-in controller 31 (scanner profile manager 38) then sets the measured value of the margin (an RGB values of a certain point in the margin or the integrated value of the RGB values taken by measuring throughout the margin) taken in Step S305 as a reference value (Step S308, please see sheet SC illustrated in FIG. 13).

Next, built-in controller 31 judges whether the current page is the last page (Step S309). On judging that the current page is the last page (YES in Step S309), built-in controller 31 ends the job processing. On judging that the current page is not the last page (NO in Step S309), built-in controller 31 increments the number of pages N by 1 (Step S310). Built-in controller 31 (patch arrangement controller 37) updates colors of patches to be printed in the margins of the N-th page of the job (Step S311). Built-in controller 31 (patch arrangement controller 37) then defines an arrangement of patches of the colors in in the upper margin and the lower margin of the N-th page to be printed, and instructs printing unit 36 to print the patches together with an image of the N-th page (Step S312).

Printing unit 36 then prints the image of the N-th page and the patches on a printing sheet according to instructions given from patch arrangement controller 37. In-line scanner 36a measures the patches printed on the sheet and a margin of the page printed on the sheet to obtain RGB values, and in-line colorimeter 36b measures the patches printed on the sheet to obtain colorimetric values (Step S313).

In response to obtaining RGB values from in-line scanner 36a and obtaining colorimetric values from in-line colorimeter 36b, built-in controller 31 (scanner profile manager 38) creates update data for grid point data of the scanner profile by using the obtained RGB values and colorimetric values of the patches (Step S314), and updates a part of the grid point data, corresponding to the colors of the measured patches, using the update data (Step S315). Built-in controller 31 (scanner profile manager 38) then sets the measured value of the margin (an RGB values of a certain point in the margin or the integrated value of the RGB values taken by measuring throughout the margin) taken in Step S313 as a comparison value (Step S316, please see sheet SD illustrated in FIG. 13).

Built-in controller 31 (scanner profile manager 38) subtracts the comparison value defined in Step S316 from the reference value defined in Step S308 to obtain the difference between the two values, and judges whether the difference exceeds a predetermined threshold value (Step S317). On judging that the difference exceeds the threshold value (YES in Step S317), built-in controller 31 returns to Step S309 to perform arranging and printing at least one patch in a blank space of each sheet and updating data of the scanner profile again. On the other hand, on judging that the difference does not exceed (is equal to or less than) the threshold value (NO in Step S317), built-in controller 31 judges that a change of the scanner conditions does not arise and there is no need to correct the scanner profile. Built-in controller 31 causes printing unit 36 to skip printing of the patches in the blank space and skips updating of the data of scanner profile. Built-in controller 31 then return to Step S203 in FIG. 10 to perform the succeeding processes (please see sheet SE illustrated in FIG. 13).

The above description was given under the assumption that the printing system has the construction illustrated in FIG. 2. In a case that the printing system has the construction that controller 20 controls printed 30 as illustrated in FIG. 1, controller 20 (built-in controller 21) executes the steps of the flowchart of FIG. 10 and the flowchart of FIGS. 11 and 12 other than Steps S202, S205, S305 and S313. In another case that the printing system includes color measurement unit 40 separately from printer 30 as illustrated in FIG. 3, color measurement unit 40 executes the measurement processes in Steps S202, S205, S305 and S313.

As described above, in the correction of a scanner profile, the following operations are performed. Built-in controller 21 of controller 20 or built-in controller 31 of printer 30 causes the scanner or in-line scanner to measure blank spaces of sheets where pages of the job were printed. Before defining a patch arrangement in a blank space of each sheet or during the correction of the scanner profile (the processes of defining a patch arrangement and printing at least one patches together with an image of a job for each sheet, and the process of updating the data of the scanner profile), built-in controller 21 or built-in controller 31 obtains a reference value and comparison values of the blank spaces of the sheets, and when obtaining the comparison value (the measured value of the blank space of each sheet), compares the difference between the reference value and the obtained comparison value with a predetermined threshold value. In response to judging that the difference exceeds the threshold value, built-in controller 21 or built-in controller 31 starts the processes of defining a patch arrangement and printing at least one patches together with an image of a job for each sheet, and the process of updating the data of the scanner profile. In response to judging that the difference between the reference value and the measured value of the margin of a page does not exceed the threshold value, built-in controller 21 or built-in controller 31 instructs printing unit 36 to skip printing of the patches and skips updating of the data of the scanner profile. Such operations prevent deterioration of the accuracy of the scanner profile before it arises, without printing excessive patches and executing excessive correction of a scanner profile.

Embodiment 3

Figure 14:
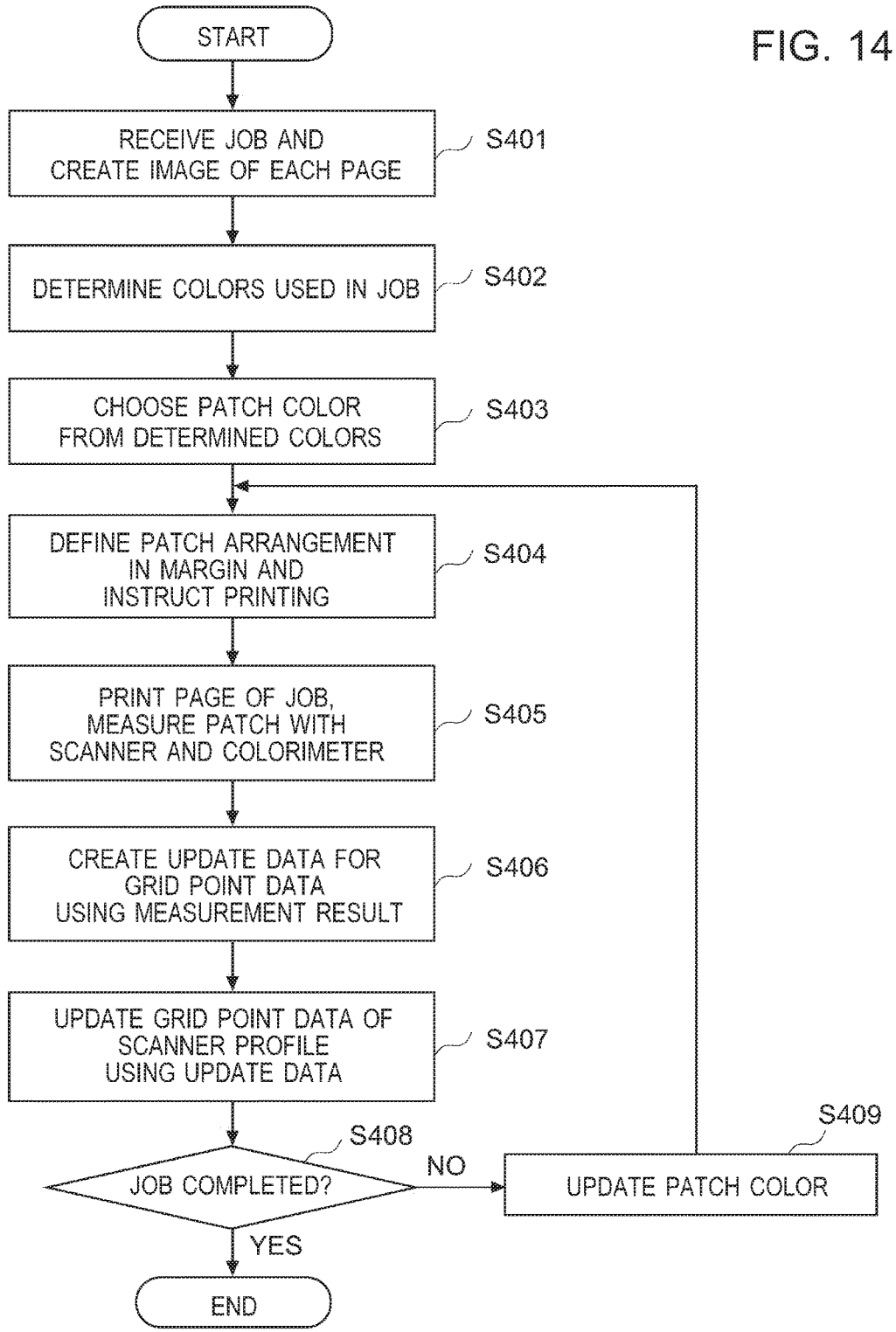
FIG. 14 is a flowchart illustrating an example of operations of a printer (which includes a controller, an in-line scanner and an in-line colorimeter) according to the third embodiment.

Next, a printer, a non-transitory recording medium storing a scanner profile correction program and a scanner profile correction method, with reference to FIG. 14. FIG. 14 is a flowchart illustrating an example of operations of the printer (which includes a controller, an in-line scanner and an in-line colorimeter) according to the present embodiment.

In Embodiment 1, the description was given of the operations to choose at least one patch color for each sheet in order from the colors of a chart to be used for creating a scanner profile, and the operations to choose at least one patch color for each sheet according to a predetermined priority order. In the disclosed operations to correct of a scanner profile, the whole grid point data of the scanner profile is not corrected at a time, and a job may be sometimes processed under the condition that the scanner profile is corrected insufficiently. In the present embodiment, the following operations are executed for realizing a sufficient correction of the scanner profile. That is, printer 30 or controller 20 analyzes a job to determine colors used in the job, and chooses at least one color of at least one patch to be arranged in a blank space of each sheet, from the determined colors.

In the following operations, the basic construction of the printing system is almost the same as that shown in Embodiment 1, but patch arrangement controller 26 of controller 20 (or patch arrangement controller 37 of printer 30) is further configured to perform the following operations. That is, patch arrangement controller 26 (or patch arrangement controller 37) obtains an analysis result of a job from image processor 23 (or image processor 35), determines colors used in the job on the basis of the analysis result, and chooses at least one color for at least one patch to be arranged in a blank space of each sheet, successively from colors used in the job and contained in the colors of the chart.

Hereinafter, a description is given of operations of the printing system according to the present embodiment. Similarly to Embodiment 1, the description is given under the assumption that the printing system employs printer 30 illustrated in FIGS. 7A and 7B. That is, the printer 30 also serves as controller 20 (in other words, built-in controller 31 of printer 30 is configured to work as patch management controller 37 and scanner profile manager 38), and printing unit 36 of printer 30 includes in-line scanner 36a and in-line colorimeter 36b. CPU 31a reads out a scanner profile correction program stored in ROM 31b or storage unit 32, loads the program onto RAM 31c, and executes the program, thereby executing the steps of the flowchart illustrated in FIG. 14.

First, built-in controller 31 receives a job sent from client terminal 10, and image processor 35 analyzes the received job and rasterizes pages of the job to create images of the pages (Step S401). On the basis of the analysis result of the job given by image processor 35, built-in controller 31 determines colors used in the received job (Step S402), and chooses at least one color of at least one patch to be printed in a blank space of each of sheets where the pages of the received job are to be printed, successively from colors used in the job and contained in the colors of a chart to be used for creating a scanner profile (Step S403). Built-in controller 31 (patch arrangement controller 37) then defines an arrangement of at least one patch of the at least one color chosen for one sheet, in a blank space of a sheet (in this embodiment, two color patches in the upper margin and the lower margin of a sheet), and instructs printing unit 36 to print the patches together with an image of a page of the job (Step S404).

In the process of choosing patch color, built-in controller 31 (patch arrangement controller 37) may choose at least one color for each sheet in order from the colors used in the job and contained in the colors of the chart, or may fix the order of priority for the colors and choose at least one color for each sheet from the colors, according to the order of priority. Further in the process of choosing patch color, built-in controller 31 (patch arrangement controller 37) may use all the colors of the chart repeatedly for choosing at least one colors for each sheet or may use specific colors among the colors of the chart with greater frequency than the rest of the colors of the chart, for choosing at least one color for each sheet. Further in the process of choosing patch color, built-in controller 31 (patch arrangement controller 37) may define the arrangement of the at least one patch for each of all the sheets where images of a job are separately to be printed, or for each of sheets selected from the sheets where images of a job are separately to be printed. Further in the process of choosing patch color, the arrangement of patches may be modified as far as at least one patch is arranged in an area where in-line colorimeter 36b can measure in a blank space of a sheet. Further, built-in controller 31 (patch arrangement controller 37) may arrange an arbitrary number of patches in a blank space of each sheet, in accordance with the size of the blank space or the size of the patches.

Next, printing unit 36 prints an image of a page and the patches on a sheet according to instructions given from patch arrangement controller 37. In-line scanner 36a and in-line colorimeter 36b measure the patches printed on the sheet to obtain RGB values and colorimetric values (Step S405).

In response to obtaining RGB values from in-line scanner 36a and obtaining colorimetric values from in-line colorimeter 36b, built-in controller 31 (scanner profile manager 38) creates update data for grid point data of the scanner profile by using the obtained RGB values and colorimetric values of the patches (Step S406), and updates a part of the grid point data, corresponding to the colors of the measured patches, using the update data (Step S407).

Next, built-in controller 31 judges whether the current page is the last page (Step S408). On judging that the current page is not the last page (NO in Step S408), built-in controller 31 (patch arrangement controller 37) updates at least one patch color (chooses at least one patch color for the next sheet) (Step S409), and returns to Step S404 to perform the succeeding processes.

The above description was given under the assumption that the printing system has the construction illustrated in FIG. 2. In a case that the printing system has the construction that controller 20 controls printed 30 as illustrated in FIG. 1, controller 20 (built-in controller 21) executes the steps of the flowchart of FIG. 14 other than Step S405. In another case that the printing system includes color measurement unit 40 separately from printer 30 as illustrated in FIG. 3, color measurement unit 40 executes the measurement process in Step S405.

As described above, the correction of a scanner profile includes the operations of determining colors used in a job on the basis of an analysis result of the job, and choosing at last one color for at least one patch to be arranged in a blank space of each sheet on the basis of the determined colors. Such operations realizes a sufficient correction of a scanner profile. For example, in a case that a scanner profile is used for inspection of printed matters, such operations can enhance the accuracy of the inspection.

It should be noted that the present invention should not be limited to the above-described examples, and the constitution and control of the system and each device can be modified suitably, unless the modification deviates from the intention of the present invention.

For example, printer 30 is not limited to a specific printing machine. CMYK printers or RGB printers may be employed as printer 30. Alternatively, electrophotographic printers, inkjet printers or offset printers may be employed as printer 30.

Though the above-described embodiments described RGB values as an example of measured color values taken with in-line scanner 36a, any kind of device dependent color value may be used as the measured color values. Similarly, though the above-described embodiments described L*a*b* values in the CIE 1976 color space and XYZ values in the CIE 1931 color space as examples of measured values taken with in-line colorimeter 36b, any kind of device-independent color value may be used as the measured color values. For example, L*u*v* values in the CIE 1976 color space or CIECAM02 values may be used as the measured values.

Though the above-described embodiments provided the operations for correcting a scanner profile by printer 30 in a printing system, the disclosed operations may be similarly applied to another printing system such that controller 20 configured to control printer 30 or configured to control printer 30 and color measurement unit 40, performs the operations for correcting a scanner profile.

The present invention is applicable to printers equipped with a scanner and a spectrocolorimeter, scanner profile correction programs for correcting a scanner profile during job processing, non-transitory recording media each storing the scanner profile correction program, and scanner profile correction methods.

Although embodiments of the present invention have been described and illustrated in detail, it is clearly understood that the same is by way of illustration and example only and not limitation, the scope of the present invention should be interpreted by terms of the appended claims.

The invention claimed is:
1. A printer comprising:
a print engine configured to print images of a job to be reproduced on respective sheets;

an in-line scanner configured to measure a printed sheet to obtain a scanner value which is a color value taken by a measurement with the in-line scanner;

an in-line spectrocolorimeter configured to measure a printed sheet to obtain a colorimeter value which is a color value taken by a measurement with the in-line spectrocolorimeter; and a hardware processor that performs operations including
controlling a patch arrangement for each of sheets where images of a job are separately to be printed by the print engine, including
choosing at least one color for each of the sheets successively from colors of a chart to be used for creating a scantier profile in which scanner values and corresponding colorimeter values are associated with each other,
defining an arrangement of at least one patch of the at least one color in a blank space of each of the sheets, and
instructing the print engine to print the at least one patch together with an image of the job on each of the sheets; and
in response to obtaining a scanner value or values, taken by a measurement of the at least one patch printed on each of the sheets, from the in-line scanner and a colorimeter value or values taken by a measurement of the at least one patch printed on the each of the sheets, from the in-line spectrocolorimeter, updating a part of data of the scanner profile, corresponding to the at least one color of the at least one patch, by using the scanner value or values and the colorimeter value or values obtained from the in-line scanner and the in-line spectrocolorimeter,
wherein:
(i) the choosing includes
determining colors used in the job, and
choosing the at least one color for each of the sheets successively from colors used in the job and contained in the colors of the chart;
(ii) the choosing includes
fixing an order of priority for the colors of the chart, and choosing the at least one color for each of the sheets, according to the order of priority;
(iii) the choosing includes
using all the colors of the chart repeatedly for choosing the at least one color for each of the sheets, or
using specific colors among the colors of the chart with a greater frequency than the rest of the colors of the chart, for choosing the at least one color for each of the sheets; or
(iv) the operations further include:
before the controlling a patch arrangement for each of the sheets, making a comparison inducing
obtaining a reference value of a blank space of one sheet from the in-line scanner, and a comparison value of a blank space of each of other sheets that the in-line scanner received after the one sheet, where the reference value is a color value taken by a measurement of the blank space with the in-line scanner and the comparison value is a color value taken by a measurement of the blank space with the in-line scanner, and
on obtaining the comparison value of the blank space of each of other sheets, comparing a difference between the reference value and the comparison value, with a predetermined threshold value; and
in response to judging that the difference exceeds the threshold value, performing the controlling a patch arrangement for the each of the sheets and the updating a part of data of the scanner profile.

2. The printer of claim 1,
wherein the choosing includes
determining colors used in the job, and
choosing the at least one color for each of the sheets successively from colors used in the job and contained in the colors of the chart.

3. The printer of claim 1,
wherein the choosing includes
fixing an order of priority for the colors of the chart, and choosing the at least one color for each of the sheets, according to the order of priority.

4. The printer of claim 1,
wherein the choosing includes
using all the colors of the chart repeatedly for choosing the at least one color for each of the sheets, or
using specific colors among the colors of the chart with a greater frequency than the rest of the colors of the chart, for choosing the at least one color for each of the sheets.

5. The printer of claim 1,
wherein the defining includes defining the arrangement of the at least one patch for each of all or a part of the sheets where images of the job are to be printed.

6. The printer of claim 1,
wherein the operations further include:
before the controlling a patch arrangement for each of the sheets, making a comparison including
obtaining a reference value of a blank space of one sheet from the in-line scanner, and a comparison value of a blank space of each of other sheets that the in-line scanner received after the one sheet, where the reference value is a color value taken by a measurement of the blank space with the in-line scanner and the comparison value is a color value taken by a measurement of the blank space with the in-line scanner, and
on obtaining the comparison value of the blank space of each of other sheets, comparing a difference between the reference value and the comparison value, with a predetermined threshold value; and
in response to judging that the difference exceeds the threshold value, performing the controlling a patch arrangement for the each of the sheets and the updating a part of data of the scanner profile.

7. The printer of claim 6,
wherein the operations further include:
during the controlling a patch arrangement for each of the sheets and the updating a part of data of the scanner profile, making the comparison, and
in response to judging that the difference does not exceed the threshold value, instructing the print engine to skip printing of the at least one patch, and skipping the updating of a part of data of the scanner profile.

8. The printer of claim 1,
wherein the scanner value is a RUB values and
the colorimeter value is a L*a*b* value in the CIE 1976 color space, a XYZ value in the CIE 1931 color space, a L*u*v* value in the CIE 1976 color space or a CIECAM02 value.

9. A non-transitory recording medium storing a computer-readable program for correcting a scanner profile in an apparatus including a hardware processor that controls a print engine configured to print images of a job to be reproduced on respective sheets, an in-line scanner configured to measure a printed sheet to obtain a scanner value which is a color value taken by a measurement with the in-line scanner, and an in-line spectrocolorimeter configured to measure a printed sheet to obtain a colorimeter value which is a color value taken by a measurement with the in-line spectrocolorimeter, the program comprising instructions which, when executed by the hardware processor, cause the hardware processor to perform operations comprising:

controlling a patch arrangement for each of sheets where images of a job are separately to be printed by the print engine, including choosing at least one color for each of the sheets successively from colors of a chart to be used for creating a scanner profile in which scanner values and corresponding colorimeter values are associated with each other, defining an arrangement of at least one patch of the at least one color in a blank space of each of the sheets, and instructing the print engine to print the at least one patch together with an image of the job on each of the sheets; and in response to obtaining a scanner value or values taken by a measurement of the at least one patch printed on each of the sheets, from the in-line scanner and a colorimeter value or values taken by a measurement of the at least one patch printed on the each of the sheets, from the in-line spectrocolorimeter, updating a part of data of the scanner profile, corresponding to the at least one color of the at least one patch, by using the scanner value or values and the colorimeter value or values obtained from the in-line scanner and the in-line spectrocolorimeter, wherein:

(i) the choosing includes determining colors used in the job, and choosing the at least one color for each of the sheets successively from colors used in the job and contained in the colors of the chart:

(ii) the choosing includes fixing an order of priority for the colors of the chart, and choosing the at least one color for each of the sheets, according to the order of priority;

(iii) the choosing includes using all the colors of the chart repeatedly for choosing the at least one color for each of the sheets, or using specific colors among the colors of the chart with a greater frequency than the rest of the colors of the chart, for choosing the at least one color for each of the sheets; or (iv) the operations further include:

before the controlling a patch arrangement for each of the sheets, making a comparison including obtaining a reference value of a blank space of one sheet from the in-line scanner, and a comparison value of a blank space of each of other sheets that the in-line scanner received after the one sheet, where the reference value is a color value taken by a measurement of the blank space with the in-line scanner and the comparison value is a color value taken by a measurement of the blank space with the in-line scanner, and on obtaining the comparison value of the blank space of each of other sheets, comparing a difference between the reference value and the comparison value, with a predetermined threshold value; and in response to judging that the difference exceeds the threshold value, performing the controlling a patch arrangement for the each of the sheets and the updating a part of data of the scanner profile.

10. The non-transitory recording medium of claim 9, wherein the choosing includes determining colors used in the job, and choosing the at least one color for each of the sheets successively from colors used in the job and contained in the colors of the chart.

11. The non-transitory recording medium of claim 9, wherein the choosing includes fixing an order of priority for the colors of the chart, and choosing the at least one color for each of the sheets, according to the order of priority.

12. The non-transitory recording medium of claim 9, wherein the choosing includes using all the colors of the chart repeatedly for choosing the at least one color for each of the sheets, or using specific colors among the colors of the chart with a greater frequency than the rest of the colors of the chart, for choosing the at least one color for each of the sheets.

13. The non-transitory recording medium of claim 9, wherein the defining includes defining the arrangement of the at least one patch for each of all or a part of the sheets where images of the job are to be printed.

14. The non-transitory recording medium of claim 9, wherein the operations further comprise:

before the controlling a patch arrangement for each of the sheets, making a comparison including obtaining a reference value of a blank space of one sheet from the in-line scanner, and a comparison value of a blank space of each of other sheets that the in-line scanner received after the one sheet, where the reference value is a color value taken by a measurement of the blank space with the in-line scanner and the comparison value is a color value taken by a measurement of the blank space with the in-line scanner, and on obtaining the comparison value of the blank space of each of other sheets, comparing a difference between the reference value and the comparison value, with a predetermined threshold value; and in response to judging that the difference exceeds the threshold value, performing the controlling a patch arrangement for the each of the sheets and the updating a part of data of the scanner profile.

15. The non-transitory recording medium of claim 14, wherein the operations further comprise:

during the controlling a patch arrangement for each of the sheets and the updating a part of data of the scanner profile, making the comparison, and in response to judging that the difference does not exceed the threshold value, instructing the print engine to skip printing of the at least one patch, and skipping the updating of a part of data of the scanner profile.

16. The non-transitory recording medium of claim 9, wherein the scanner value is a RGB values and the colorimeter value is a L*a*b* value in the CIE 1976 colorspace, a XYZ value in the CIE 1931 color space, a L*u*v* value in the CIE 1976 color space or a CIECAM02 value.

17. A method of correcting a scanner profile in a system including
a print engine configured to print images of a job to be reproduced on respective sheets,
an in-line scanner configured to measure a printed sheet to obtain a scanner value which is a color value taken by a measurement with the in-line scanner, and
an in-line spectrocolorimeter configured to measure a printed sheet to obtain a colorimeter value which is a color value taken by a measurement with the in-line spectrocolorimeter,
the method comprising:
controlling a patch arrangement for each of sheets where images of a job are separately to be printed by the print engine, including
choosing at least one color for each of the sheets successively from colors of a chart to be used for creating, a scanner profile in which scanner values and corresponding colorimeter values are associated with each other,
defining an arrangement of at least one patch of the at least one color in a blank space of each of the sheets, and
instructing the print engine to print the at least one patch together with an image of the job on each of the sheets; and
in response to Obtaining a scanner value or values taken by a measurement of the at least one patch printed on each of the sheets, from the in-line scanner and a colorimeter value or values taken by a measurement of the at least one patch printed on the each of the sheets, from the in-line spectrocolorimeter, updating a part of data of the scanner profile, corresponding to the at least one color of the at least one patch, by using the scanner value or values and the colorimeter value or values obtained from the in-line scanner and the in-line spectrocolorimeter,
wherein:
(i) the choosing includes
determining colors used in the job, and
choosing the at least one color for each of the sheets successively from colors used in the job and contained in the colors of the chart;
(ii) the choosing includes
fixing an order of priority for the colors of the chart, and
choosing the at least one color for each of the sheets, according to the order of priority;
(iii) the choosing includes
using all the colors of the chart repeatedly for choosing the at least one color for each of the sheets, or
using specific colors among the colors of the chart with a greater frequency than the rest of the colors of the chart, for choosing, the at least one color for each of the sheets; or
(iv) the operations further include:
before the controlling a patch arrangement for each of the sheets, making a comparison including
obtaining a reference value of a blank space of one sheet from the in-line scanner, and a comparison value of a blank space of each of other sheets that the in-line scanner received after the one sheet, where the reference value is a color value taken by a measurement of the blank space with the in-line scanner and the comparison value is a color value taken by a measurement of the blank space with the in-line scanner, and
on obtaining the comparison value of the blank space of each of other sheets, comparing a difference between the reference value and the comparison value, with a predetermined threshold value; and
in response to judging that the difference exceeds the threshold value, performing the controlling a patch arrangement for the each of the sheets and the updating a part of data of the scanner profile.

18. The method of claim 17,
wherein the choosing includes
determining colors used in the job, and
choosing the at least one color for each of the sheets successively from colors used in the job and contained in the colors of the chart.

19. The method of claim 17,
wherein the choosing includes
fixing an order of priority for the colors of the chart, and
choosing the at least one color for each of the sheets, according to the order of priority.

20. The method of claim 17,
wherein the choosing includes
using all the colors of the chart repeatedly for choosing the at least one color for each of the sheets, or
using specific colors among the colors of the chart with a greater frequency than the rest of the colors of the chart, for choosing the at least one color for each of the sheets.

21. The method of claim 17,
wherein the defining includes defining the arrangement of the at least one patch for each of all or a part of the sheets where images of the job are to be printed.

22. The method of claim 17, further comprises:
before the controlling a patch arrangement for each of the sheets, making a comparison including
obtaining a reference value of a blank space of one sheet from the in-line scanner, and a comparison value of a blank space of each of other sheets that the in-line scanner received after the one sheet, where the reference value is a color value taken by a measurement of the blank space with the in-line scanner and the comparison value is a color value taken by a measurement of the blank space with the in-line scanner, and
on obtaining the comparison value of the blank space of each of other sheets, comparing a difference between the reference value and the comparison value, with a predetermined threshold value; and
in response to judging that the difference exceeds the threshold value, performing the controlling a patch arrangement for the each of the sheets and the updating a part of data of the scanner profile.

23. The method of claim 22, further comprises:
during the controlling a patch arrangement for each of the sheets and the updating a part of data of the scanner profile, making the comparison; and
in response to judging that the difference does not exceed the threshold value, instructing the print engine to skip printing of the at least one patch, and skipping the updating of a part of data of the scanner profile.

24. The method of claim 17,
wherein the scanner value is a RGB values and the colorimeter value is a L*a*b* value in the CIE 1976 color space, a XYZ value in the CIE 1931 color space, a L*u*v* value in the CIE 1976 color space or a CIECAM02 value.

* * * * *